US011105556B2

(12) United States Patent
Chou et al.

(10) Patent No.: US 11,105,556 B2
(45) Date of Patent: *Aug. 31, 2021

(54) TEMPERATURE-CONTROLLED PORTABLE COOLING UNITS

(71) Applicant: Tokitae LLC, Bellevue, WA (US)

(72) Inventors: Fong Li Chou, Bellevue, WA (US); Philip A. Eckhoff, Kirkland, WA (US); Lawrence Morgan Fowler, Kirkland, WA (US); Shieng Liu, Bellevue, WA (US); Peter K. Maier-Laxhuber, Pfaffenhofen (DE); Nels R. Peterson, Bellevue, WA (US); Ralf W. Schmidt, Freising (DE); Clarence T. Tegreene, Mercer Island, WA (US); Lowell L. Wood, Jr., Bellevue, WA (US); Reiner M. Worz, Reichertshausen (DE); David J. Yager, Carnation, WA (US)

(73) Assignee: Tokitae, LLC, Bellevue, WA (US)

( * ) Notice: Subject to any disclaimer, the term of this patent is extended or adjusted under 35 U.S.C. 154(b) by 926 days.

This patent is subject to a terminal disclaimer.

(21) Appl. No.: 14/885,043

(22) Filed: Oct. 16, 2015

(65) Prior Publication Data

US 2016/0084577 A1 Mar. 24, 2016

Related U.S. Application Data

(63) Continuation-in-part of application No. 13/853,277, filed on Mar. 29, 2013, now Pat. No. 9,170,053.

(51) Int. Cl.
*F28C 3/08* (2006.01)
*F25B 17/08* (2006.01)
(Continued)

(52) U.S. Cl.
CPC ............. *F28C 3/08* (2013.01); *B23P 15/26* (2013.01); *B65D 81/38* (2013.01); *F25B 17/08* (2013.01);
(Continued)

(58) Field of Classification Search
CPC ........ F24F 5/0035; Y02B 30/545; F28C 3/08; F25B 17/08; F25B 49/046; F25D 31/006;
(Continued)

(56) References Cited

U.S. PATENT DOCUMENTS 1,636,529 A 7/1927 Motschman
1,639,529 A * 8/1927 Payson ............. B65D 81/3846
215/13.1
(Continued)

FOREIGN PATENT DOCUMENTS

CN 1047730 A 12/1990
CN 1263245 A 8/2000
(Continued)

OTHER PUBLICATIONS

State Intellectual Property Office of P.R.C.; First Office Action; Application No. 201480019305.5; dated Dec. 6, 2016 (received by our Agent on Dec. 12, 2016); pp. 1-10 (machine translation provided).
(Continued)

*Primary Examiner* — Joel M Attey
*Assistant Examiner* — For K Ling
(74) *Attorney, Agent, or Firm* — Adam L. K. Philipp; Elizabeth L. Schubert; AEON Law

(57) ABSTRACT

Portage storage containers including controlled evaporative cooling systems are described herein. In some embodiments, a portable container including an integral controlled evaporative cooling system includes: a storage region, an evaporative region adjacent to the storage region, a desiccant
(Continued)

region adjacent to the outside of the container, and an insulation region positioned between the evaporative region and the desiccant region. A vapor conduit with an attached vapor control unit has a first end within the evaporative region and a second end within the desiccant region. In some embodiments, the controlled evaporative cooling systems are positioned in a radial configuration within the portable container.

12 Claims, 12 Drawing Sheets

(51) Int. Cl.
  F25B 49/04       (2006.01)
  F25D 31/00       (2006.01)
  B65D 81/38       (2006.01)
  B23P 15/26       (2006.01)
(52) U.S. Cl.
  CPC .......... *F25B 49/046* (2013.01); *F25D 31/006* (2013.01)
(58) Field of Classification Search
  CPC ....... F25D 3/125; F25D 3/08; B65D 81/3837; B65D 81/3811; B65D 81/3806; B65D 81/3804; B65D 81/3802; B65D 81/3846
  USPC .............................................. 62/259.4, 457.1
  See application file for complete search history.

(56) References Cited

U.S. PATENT DOCUMENTS

| | | |
|---|---|---|
| 1,862,330 A | 6/1932 | Chapin et al. |
| 1,955,723 A | 4/1934 | Alex |
| 2,871,674 A * | 2/1959 | Koivisto ................. F25B 17/08 62/232 |
| 3,642,059 A * | 2/1972 | Greiner .................. C09K 5/047 165/104.12 |
| 3,871,674 A | 3/1975 | Bunn, Jr. |
| 3,953,983 A | 5/1976 | Sander |
| 4,001,601 A | 1/1977 | Schuster |
| 4,007,601 A | 2/1977 | Webbon |
| 4,048,810 A * | 9/1977 | Zeilon ...................... F25B 25/02 62/101 |
| 4,057,029 A | 11/1977 | Setter |
| 4,205,531 A | 6/1980 | Brunberg et al. |
| 4,646,934 A | 3/1987 | Mcallister |
| 4,718,020 A * | 1/1988 | Duich ................ B01D 53/0454 700/271 |
| 4,846,257 A * | 7/1989 | Wallace .................. A45C 11/20 165/253 |
| 4,924,676 A | 5/1990 | Maier-Laxhuber et al. |
| 5,186,020 A | 2/1993 | Rockenfeller et al. |
| 5,207,073 A | 5/1993 | Maier-Laxhuber et al. |
| 5,359,861 A | 11/1994 | Maier-Laxhuber et al. |
| 5,415,012 A | 5/1995 | Maier-Laxhuber et al. |
| 5,440,896 A | 8/1995 | Maier-Laxhuber et al. |
| 5,444,223 A | 8/1995 | Blama |
| 5,518,069 A | 5/1996 | Maier-Laxhuber et al. |
| 5,600,071 A | 2/1997 | Sooriakumar et al. |
| 5,709,472 A | 1/1998 | Prusik et al. |
| 5,740,680 A | 4/1998 | Lee |
| 5,816,069 A | 10/1998 | Ebbeson |
| 5,816,089 A | 10/1998 | Marando |
| 5,900,554 A | 5/1999 | Baba et al. |
| 6,042,264 A | 3/2000 | Prusik et al. |
| 6,349,560 B1 | 2/2002 | Maier-Laxhuber et al. |
| 6,378,326 B2 | 4/2002 | Maier-Laxhuber et al. |
| 6,389,839 B1 | 5/2002 | Sabin |
| 6,438,992 B1 | 8/2002 | Smith et al. |
| 6,584,797 B1 | 7/2003 | Smith et al. |
| 6,688,132 B2 | 2/2004 | Smith et al. |
| 6,701,724 B2 | 3/2004 | Smith et al. |
| 6,820,441 B2 | 11/2004 | Maier-Laxhuber et al. |
| 6,955,196 B2 | 10/2005 | Giudici et al. |
| 7,213,403 B2 | 5/2007 | Maier-Laxhuber et al. |
| 7,213,411 B2 | 5/2007 | Maier-Laxhuber et al. |
| 7,240,507 B2 | 7/2007 | Jeuch |
| 7,543,455 B1 | 6/2009 | Chen |
| 7,726,139 B2 | 6/2010 | Maier-Laxhuber |
| 2001/0025510 A1 | 10/2001 | Maier-Laxhuber et al. |
| 2003/0033829 A1 | 2/2003 | Smith et al. |
| 2003/0230092 A1 | 12/2003 | Lowenstein et al. |
| 2004/0031282 A1 * | 2/2004 | Kopko .................. F24F 3/1417 62/271 |
| 2004/0231346 A1 | 11/2004 | Smith et al. |
| 2006/0191287 A1 | 8/2006 | Maier-Laxhuber |
| 2006/0248910 A1 | 11/2006 | Smolko et al. |
| 2008/0276640 A1 | 11/2008 | Bhatti et al. |
| 2009/0031615 A1 | 2/2009 | Joshi et al. |
| 2009/0049845 A1 | 2/2009 | McStravick et al. |
| 2009/0227003 A1 | 9/2009 | Blotsky et al. |
| 2009/0321349 A1 | 12/2009 | Offerman et al. |
| 2010/0213200 A1 * | 8/2010 | Deane ................ B65D 81/3802 220/592.2 |
| 2011/0003357 A1 | 1/2011 | Barclay et al. |
| 2011/0091954 A1 | 4/2011 | Chen et al. |
| 2011/0127273 A1 * | 6/2011 | Deane ....................... A61J 1/00 220/592.2 |
| 2011/0201063 A1 | 8/2011 | Mitropoulos |
| 2011/0287497 A1 | 11/2011 | Holtzapple et al. |
| 2012/0000918 A1 * | 1/2012 | Deane ................ B65D 81/3802 220/592.2 |
| 2013/0008182 A1 | 1/2013 | Hrudka |
| 2013/0143290 A1 | 6/2013 | Narendranath |
| 2013/0306656 A1 * | 11/2013 | Eckhoff .................. F25D 3/125 220/592.26 |
| 2015/0027157 A1 | 1/2015 | Chou et al. |
| 2016/0084577 A1 | 3/2016 | Chou et al. |

FOREIGN PATENT DOCUMENTS

| | | |
|---|---|---|
| CN | 102165498 A | 8/2011 |
| CN | 102336304 A | 2/2012 |
| CN | 102869932 A | 1/2013 |
| CN | 106794114 A | 5/2017 |
| DE | 477 542 C | 7/1928 |
| DE | 447542 C | 7/1928 |
| DE | 10 2007 010 981 A1 | 9/2008 |
| EP | 1143210 A1 | 10/2001 |
| EP | 2 447 624 A2 | 5/2012 |
| JP | 02-078281 A | 3/1990 |
| JP | H0278281 A | 3/1990 |
| JP | H0518652 A | 1/1993 |
| JP | H05288444 A | 11/1993 |
| JP | 10-029457 A | 2/1998 |
| JP | H1029457 A | 2/1998 |
| JP | 10-238918 A | 9/1998 |
| JP | H10238918 A | 9/1998 |
| JP | 2004085184 A | 3/2004 |
| JP | 2004294023 A | 10/2004 |
| JP | 2007118972 A | 5/2007 |
| WO | 2011131683 A1 | 10/2011 |
| WO | 2013/001390 A1 | 1/2013 |
| WO | 2013001390 A1 | 1/2013 |
| WO | WO2013/001390 A1 | 1/2013 |

OTHER PUBLICATIONS

PCT International Search Report; International App. No. PCT/US2016/056785; dated Jan. 26, 2017; pp. 1-3.

European Patent Office; Supplementary European Search Report; Pursuant to Rule 62 EPC; App. No. EP 14773074.1; dated Feb. 20, 2017 (received by our Agent on Mar. 2, 2017); pp. 1-10.

European Patent Office, Extended European Search Report, Pursuant to Rule 62 EPC; App. No. EP 15 830 436; dated Mar. 2, 2018; pp. 1-9.

PCT International Search Report; International App. No. PCT/US2018/021379; dated Jun. 18, 2018; pp. 1-4.

(56) References Cited

OTHER PUBLICATIONS

Pakistani Examination Report; 1 page total (received by our Agent on Aug. 5, 2018).
European Patent Office, Supplementary European Search Report, Pursuant to Rule 164 EPC; App. No. EP 14773074.1; dated Oct. 14, 2016 (received by our Agent on Nov. 4, 2016); pp. 1-8.
3M Monitor Mark™; "Time Temperature Indicators—Providing a visual history of time temperature exposure"; 3M Microbiology; 2006; pp. 1-4; located at http://multimedia.3m.com/mws/mediawebserver?mwsId=SSSSSufSevTsZxtUMx_9nxtBevUqevTSevTSevTSeSSSSSS—&fn=78-6901-2024-7.pdf.
BINE Informationsdienst; "Zeolite/water refrigerators, Projektinfo 16/10"; BINE Information Service; printed on Feb. 12, 2013; pp. 1-4; FIZ Karlsruhe, Germany; located at: http://www.bine.info/fileadmin/content/Publikationen/Englische_Infos/projekt_1610_engl_internetx.pdf.
Cole-Parmer; "Temperature Labels and Crayons"; printed on Sep. 27, 2007; p. 1; located at: www.coleparmer.com.
Conde-Petit, Manuel R.; "Aqueous solutions of lithium and calcium chlorides:—Property formulations for use in air conditioning equipment design"; 2009; pp. 1-27 plus two cover pages; M. Conde Engineering, Zurich, Switzerland.
Cool-System Keg GmbH; "Cool-System presents: CoolKeg® The world's first self-chilling Keg!"; printed on Feb. 6, 2013; pp. 1-5; located at: http://www.coolsystem.de/.
Dawoud, et al.; "Experimental study on the kinetics of water vapor sorption on selective water sorbents, silica gel and alumina under typical operating conditions of sorption heat pumps"; International Journal of Heat and Mass Transfer; 2003; pp. 273-281; vol. 46; Elsevier Science Ltd.
Dometic S.A.R.L.; "Introduction of Zeolite Technology into refrigeration systems, LIFE04 ENV/LU/000829, Layman's Report"; printed on Feb. 6, 2013; pp. 1-10; located at: http://ec.europa.eu/environment/life/project/Projects/index.cfm?fuseaction=home.showFile&rep=file&fil=LIFE04_ENV_LU_000829_LAYMAN.pdf.
Dow Chemical Company; "Calcium Chloride Handbook: A Guide to Properties, Forms, Storage and Handling"; Aug. 2003; pp. 1-28.
Fesmire, James E.; "Standardization in cryogenic insulation systems testing and performance data"; Physics Procedia; 2015; pp. 1089-1097; vol. 67; Elsevier B.V.
Gast Manufacturing, Inc.; "Vacuum and Pressure Systems Handbook"; printed on Jan. 3, 2013; pp. 1-20; located at: http://www.gastmfg.com/vphb/vphb_s1.pdf.
Gea Wiegand; "Pressure loss in vacuum lines with water vapour"; printed on Mar. 13, 2013; pp. 1-2; located at: http://produkte.gea-wiegand.de/GEA/GEACategory/139/index_en.html.
Hall, Larry D.; "Building Your Own Larry Hall Icyball"; printed on Mar. 27, 2013; pp. 1-4; located at: http://crosleyautoclub.com/IcyBall/HomeBuilt/HallPlans/IB_Directions.html.
Kozubal, et al.; "Desiccant Enhanced Evaporative Air-Conditioning (DEVap): Evaluation of a New Concept in Ultra Efficient Air Conditioning, Technical Report NREL/TP-5500-49722"; National Renewable Energy Laboratory; Jan. 2011; pp. i-vii, 1-60, plus three cover pages and Report Documentation Page.
machine-history.com; "Refrigeration Machines"; printed on Mar. 27, 2013; pp. 1-10; located at: http://www.machine-history.com/Refrigeration%20Machines.
Marquardt, Niels; "Introduction to the Principles of Vacuum Physics"; 1999; pp. 1-24; located at: http://www.cientificosaficionados.com/libros/CERN/vaciol_CERN.pdf.
Modern Mechanix; "Icyball Is Practical Refrigerator for Farm or Camp Use (Aug. 1930)"; bearing a date of Aug. 1930; printed on Mar. 27, 2013; pp. 1-3; located at: http://blog.modernmechanix.com/icyball-is-practical-refrigerator-for-farm-or-camp-use/.
OxyChem; "Calcium Chloride, A Guide to Physical Properties"; printed on Jan. 3, 2013; pp. 1-9, plus two cover pages and back page; Occidental Chemical Corporation; located at: http://www.cal-chlor.com/PDF/GUIDE-physical-properties.pdf.
Pilatowsky, I., Romero, R.J., Isaza, C.A., Gamboa, S.A., Sebastian, P.J., and Rivera, W.; "Chapter 5: Sorption Refrigeration Systems";
Cogeneration Fuel Cell-Sorption Air Conditioning Systems; Green Energy and Technology; 2011; pp. 75-102; Springer; ISBN 978-1-84996-027-4.
Restuccia, et al.; "Selective water sorbent for solid sorption chiller: experimental results and modeling"; International Journal of Refrigeration; 2004; pp. 284-293; vol. 27; Elsevier Ltd and IIR.
Rezk, et al.; "Physical and operating conditions effects on silica gel/water adsorption chiller performance"; Applied Energy; 2012; pp. 142-149; vol. 89; Elsevier Ltd.
Rietschle Thomas; "Calculating Pipe Size & Pressure Drops in Vacuum Systems, Section 9—Technical Reference"; printed on Jan. 3, 2013; pp. 9-5 through 9-7; located at: http://www.ejglobalinc.com/Tech.htm.
Saha, et al.; "A new generation of cooling device employing $CaCl_2$-in-silica gel-water system"; International Journal of Heat and Mass Transfer; 2009; pp. 516-524; vol. 52; Elsevier Ltd.
ShockWatch; "Environmental Indicators"; printed on Sep. 27, 2007; pp. 1-2; located at: www.shockwatch.com.
UOP; "An Introduction to Zeolite Molecular Sieves"; printed on Jan. 10, 2013; pp. 1-20; located at: http://www.eltrex.pl/pdf/karty/adsorbenty/ENG-Introduction%20to%20Zeolite%20Molecular%20Sieves.pdf.
Wang, et al.; "Study of a novel silica gel-water adsorption chiller. Part I. Design and performance prediction"; International Journal of Refrigeration; 2005; pp. 1073-1083; vol. 28; Elsevier Ltd and IIR.
Wikipedia; "Icyball"; Mar. 14, 2013; printed on Mar. 27, 2013; pp. 1-4; located at: http://en.wikipedia.org/wiki/Icyball.
Yong et al.; "Adsorption Refrigeration: A Survey of Novel Technologies"; Recent Patents on Engineering; 2007; pp. 1-21; vol. 1, No. 1; Bentham Science Publishers Ltd.
European Patent Office, Extended European Search Report, Pursuant to Rule 62 EPC; App. No. EP 16856165.2; dated May 10, 2019 (received by our Agent on May 15, 2019); pp. 1-8.
Japan Patent Office, First Office Action, App. No. 2016-505559 (based on PCT Patent Application No. PCT/US2014/031965); dated Mar. 20, 2018; pp. 1-6.
Chinese State Intellectual Property Office; Notification of the First Office Action, App. No. 201580053956.0 (Based on PCT Patent Application No. PCT/US2015/043808); dated Feb. 11, 2019; pp. 1-4 (machine translation provided).
Intellectual Property Office of Singapore, Notification of Examiner's Report, App. No. 11201802112T (based on PCT App. No. PCT/US2016/056785); dated Sep. 3, 2019 (received by our Agent on Sep. 18, 2019); pp. 1-8 (machine translation provided).
Chinese State Intellectual Property Office, Notification of the First Office Action, App. No. 201680058168.5 (based on PCT App. No. PCT/US2016/056785); dated Aug. 14, 2019 (received by our Agent on Aug. 22, 2019); pp. 1-19 (machine translation provided).
"Calcium Chloride: A Guide to Physical Properties," Oxychem pp. 1-9 (plus 2 cover pages and back page), Occidental Chemical Corporation, Jan. 3, 2013 http://www.cal-chlor.com/PDF/GUIDE-physical-properties.pdf.
"Calculating Pipe Size & Pressure Drops in Vacuum Systems," Rietschle Thomas, Section 9—Technical Reference, pp. 9-5 through 9-7, Jan. 3, 2013 http://www.ejglobalinc.com/Tech.htm.
Conde-Petit, M.R., "Aqueous Solutions of Lithium and Calcium Chlorides: Property Formulations for Use in Air Conditioning Equipment Design," pp. 1-27 (plus two cover pages), M. Conde Engineering, Zurich, Switzerland, 2009.
Dawoud, B., and Aristov, Y., "Experimental Study on the Kinetics of Water Vapor Sorption on Selective Water Sorbents, Silica Gel and Alumina Under Typical Operating Conditions of Sorption Heat Pumps," International Journal of Heat and Mass Transfer 46:273-281, Elsevier Science Ltd., 2003.
Extended European Search Report, Pursuant to Rule 62 EPC, European Patent Office, for Application No. EP 15 830 436, ,dated Mar. 2, 2018, pp. 1-9.
"Environmental Indicators," Schockwatch, pp. 1-2, Sep. 27, 2007 www.shockwatch.com.
Fesmire, J.E., "Standardization in Cryogenic Insulation Systems Testing and Performance Data," Physics Procedia 67:1089-1097, Elsevier B.V., 2015.

(56) References Cited

OTHER PUBLICATIONS

First Office Action for Application No. 201480019305.5 filed Dec. 6, 2016, from the State Intellectual Property Office of P.R.C., (received by our Agent on Dec. 12, 2016), pp. 1-10 (machine translation provided).
Hall, L.D., "Building Your Own Larry Hall Icyball," pp. 1-4, Mar. 27, 2013 <http://crosleyautoclub.com/IcyBall/HomeBuilt/HallPlans/IB_Directions.html>.
"Icyball," Wikipedia, pp. 1-4, Mar. 14, 2013, printed on Mar. 27, 2013, http://en.wikipedia.org/wiki/Icyball.
"IcyBall Is Practical Refrigerator for Farm or Camp Use," Modern Mechanix, pp. 1-3, Aug. 1930, printed Mar. 27, 2013 at http://blog.modernmechanix.com/icyball-is-practical-refrigerator-for-farm-or-camp-use/.
International Search Report dated Jan. 26, 2017, for PCT/US2016/056785, filed Oct. 13, 2016, pp. 1-3.
International Search Report dated Jun. 18, 2018, for PCT/US2018/021379, filed Mar. 7, 2018, pp. 1-4.
"Introduction of Zeolite Technology into Refrigeration Systems," LIFE04 ENV/LU000829, Layman's Report, pp. 1-10, Dometic S.A.R.L., Feb. 6, 2013 http://ec.europa.eu/environment/life/project/Projects/index.dfm?fuseaction=home.showFkile&rep=file&fil=LIFE04_ENV_LU_000829_LAYMAN.pdf.
Kozubal, E., et al., "Dessicant Enhanced Evaporative Air-Conditioning (DEVap): Evaluation of a New Concept in Ultra Efficient Air Conditioning," Technical Report NREL/TP-5500-49722, pp. i-vii, 1-60 (plus 3 cover pages and report documentation page), National Renewable Energy Laboratory, Jan. 2011.
Marquardt, N., "Introduction to the Principles of Vacuum Physics," pp. 1-24, 1999 <http://www.cientificosaficionados.com/libros/CERN/vaciol-CERN.pdf>.
Pilatowsky, I., et al., "Chapter 5: Sorption Refrigeration Systems," Cogeneration Fuel Cell-Sorption Air Conditioning Systems, Green Energy and Technology, pp. 75-102, Springer, ISBN 978-1 84996-027-4, 2004.
Restuccia, G., et al., "Selective Water Sorbent for Solid Sorption Chiller: Experimental Results and Modeling," International Journal of Refrigeration 27:284-293, Elsevier Ltd and IIR, 2004.
Rezk, et al., "Physical and Operating Conditions Effects on Silica Gel/Water Adsorption Chiller Performance," Applied Energy 89:142-149, Elsevier Ltd., 2012.
Saha, B.B., et al., "A New Generation of Cooling Device Employing CaCl2-in-Silica Gel-Water System," International Journal of Heat and Mass Transfer 52:516-524, Elsivier Ltd., 2009.
Supplementary European Search Report, Pursuant to Rule 164, European Patent Office, for Application No. EP 14773074.1 dated Oct. 14, 2016 (received from our Agent on Nov. 4, 2016), pp. 1-8.
Supplemental European Search Report, Pursuant to Rule 62, European Patent Office, for Application No. EP 14773074.1, dated Feb. 20, 2017 (received by our Agent on Mar. 2, 2017), pp. 1-10.
"Temperature Labels and Crayons," Cole-Parmer, p. 1, Sep. 27, 2007 www.coleparmer.com.
"Vacuum and Pressure Systems Handbook," pp. 1-20, Gast Manufacturing, Inc., Jan. 3, 2013, http://www.gastmfg.com/vphb/vphb_s1.pdf.
Yong, et al., "Adsorption Refrigeration: A Survey of Novel Technologies," Recent Patents on Engineering 1(1):1-21, Bentham Science Publishers Ltd., 2007.
Patil et al., Towards Sustainable Production of Biofuels from Microalgae, Int. J. Mol. Sci. 2008, 9, 1188-1195.
PCT International Search Report; International App. No. PCT/US2015/043808; dated Sep. 30, 2015; pp. 1-3.
Subhadra, Sustainability of algal biofuel production using integrated renewable energy park (IREP) and algal biorefinery approach, Energy Policy, 38 (2010) 5892-5901.
U.S. Appl. No. 13/853,277, Eckhoff et al.
U.S. Appl. No. 14/454,899 Chou et al.
Ventura et al., Life cycle analyses of CO2, energy, and cost for four different routes of microalgal bioenergy conversion, Bioresource Technology vol. 137, Jun. 2013, pp. 302-310.

\* cited by examiner

FIG. 7

700 A method of assembly of a set of portable container sections

710 Positioning a storage container including an integral evaporative cooling system and an evaporative section of a vapor conduit with an aperture external to the storage container within a desiccant section including an internal insulation unit and an outer desiccant region and a desiccant section of a vapor conduit with an aperture external to the desiccant section so that an exterior surface of the storage container is positioned within the insulation unit and the aperture of the evaporative section of the vapor conduit and the aperture of the desiccant section of the vapor conduit are aligned with each other

720 Positioning a central vapor conduit section with a first end and a second end adjacent to the evaporative section and the desiccant section so that the first end of the central vapor conduit connects to the aperture of the evaporative section of the vapor conduit and the second end of the central vapor conduit connects to the aperture of the desiccant section of the vapor conduit

730 Sealing the first end of the central vapor conduit to the aperture of the evaporative section of the vapor conduit with a gas-impermeable seal

740 Sealing the second end of the central vapor conduit to the aperture of the desiccant section of the vapor conduit with a gas-impermeable seal

750 substantially evacuating a continuous vapor-sealed interior region within the storage container, the desiccant section and the connected vapor conduit sections

TEMPERATURE-CONTROLLED PORTABLE COOLING UNITS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)).

PRIORITY APPLICATIONS

The present application constitutes a continuation-in-part of U.S. patent application Ser. No. 13/853,277, entitled Temperature-Controlled Portable Cooling Units, naming Philip A. Eckhoff, Nels R. Peterson, Clarence T. Tegreene, and Lowell L. Wood, Jr. as inventors, filed 29 Mar. 2013, now U.S. Pat. No. 9,170,053.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

SUMMARY

In some embodiments, a portable container including an integral controlled evaporative cooling system includes: a storage container wall sealed to a storage container bottom, the storage container wall and storage container bottom positioned to form a storage container with an access aperture; an evaporative region wall sealed to an evaporative region bottom, the evaporative region wall positioned adjacent to an exterior of the storage container wall and the evaporative region bottom positioned adjacent to an exterior of the storage container bottom, a top edge of the evaporative region wall sealed to the exterior of the storage container wall at a position below a top edge of the storage container wall to form a vapor-sealed evaporative region between the evaporative region wall and the evaporative region bottom and the storage container wall and the storage container bottom; an insulation wall positioned adjacent to an exterior surface of the evaporative region wall and the storage container wall, a top of the insulation wall sealed to the exterior surface of the storage container wall at a position above the evaporative region wall to form a vapor-sealed insulation region external to the storage container and to the evaporative region; a desiccant region wall positioned adjacent to an exterior surface of the insulation wall and sealed to the exterior surface of the insulation wall to form a vapor-sealed desiccant region, the desiccant region wall positioned to form an exterior surface of the portable container; a vapor conduit with a first end positioned within the vapor-sealed evaporative region and a second end positioned within the vapor-sealed desiccant region; and a vapor control unit attached to the vapor conduit.

In some embodiments, a set of portable container sections for assembly includes: a storage container with an integrated controlled evaporative cooler, including an interior storage container positioned with an access aperture at an upper region of the interior storage container, an outer storage container positioned with an access aperture at an upper region of the interior storage container, the outer storage container sealed to the interior storage container at a position adjacent to the access aperture to form an vapor-sealed evaporative region between the interior storage container and the outer storage container, and an evaporative section of a vapor conduit, the evaporative section including a first end positioned within the vapor-sealed evaporative region and a second end positioned at an upper region of the storage container with an aperture external to the storage container; a desiccant section including an insulation unit with an interior surface of a size and shape to mate with an exterior surface of the storage container, and of a size and shape to extend beyond the access aperture of the storage container, a desiccant region wall encircling the insulation unit, the desiccant region wall sealed to an exterior of the insulation unit with a vapor-impermeable seal to form a desiccant region exterior to the insulation unit, and a desiccant section of a vapor conduit, the desiccant section including a first end positioned within the desiccant region and a second end positioned at an upper region of the desiccant region with an aperture external to the desiccant region; and a central vapor conduit section, including a first end of a size and shape to mate and seal with the second end of the evaporative section of the vapor conduit, a second end of a size and shape to mate and seal with the second end of the desiccant section of the vapor conduit, and a connector section of the central vapor conduit positioned between the first end of the central vapor conduit and the second end of the central vapor conduit, the connector section of a size and shape to position the first end to mate and seal with the second end of the evaporative section and position the second end to mate and seal with the second end of the desiccant section; wherein the vapor conduit includes an attached vapor control unit and wherein the evaporative section, the desiccant section and the central vapor conduit section are each of a size and shape to fit together into a continuous vapor-sealed interior region of an integrated portable container including a controlled integral controlled evaporative cooling system.

In some embodiments, a method of assembly of a setoff portable container sections includes: positioning a storage container including an integral controlled evaporative cooling system and an evaporative section of a vapor conduit with an aperture external to the storage container within a desiccant section including an internal insulation unit and an outer desiccant region and a desiccant section of a vapor conduit with an aperture external to the desiccant section so that an exterior surface of the storage container is positioned within the insulation unit and the aperture of the evaporative section of the vapor conduit and the aperture of the desiccant section of the vapor conduit are aligned with each other; positioning a central vapor conduit section with a first end and a second end adjacent to the evaporative section and the desiccant section so that the first end of the central vapor conduit connects to the aperture of the evaporative section of the vapor conduit and the second end of the central vapor conduit connects to the aperture of the desiccant section of the vapor conduit; sealing the first end of the central vapor conduit to the aperture of the evaporative section of the vapor conduit with a gas-impermeable seal; sealing the second end of the central vapor conduit to the aperture of the desiccant section of the vapor conduit with a gas-impermeable seal; and substantially evacuating a continuous vapor-sealed interior region within the storage container, the desiccant section and the connected vapor conduit sections.

In some embodiments, a portable container including an integral controlled evaporative cooling system includes: an insulated storage compartment including at least one wall forming sides and a bottom of an interior of a storage container with an access aperture, at least one wall forming sides and a bottom of an exterior of the storage container, wherein the exterior is positioned adjacent to the interior and there is a gap between the exterior and the interior, a seal between the at least one wall forming the sides and the bottom of the interior and the at least one wall forming the sides and the bottom of the exterior, the seal forming a gas-impermeable gap between the walls; and a lid of a size and shape to match the insulated storage compartment, including at least one wall forming sides and a bottom of the lid, the sides and bottom of a size and shape to reversibly mate with the interior of the storage container at a position adjacent to the access aperture, at least one wall forming a top of the lid, the top of the lid affixed to the sides of the lid, an evaporative compartment positioned within the lid at a position adjacent to the bottom of the lid, the evaporative compartment including an internal evaporative region, the evaporative compartment including an aperture at a position distal to the bottom of the lid, a desiccant compartment within the lid at a position adjacent to the top of the lid, the desiccant compartment including an internal desiccant region, the desiccant compartment including an aperture at a position distal to the top of the lid, and a vapor conduit affixed at a first end to the aperture in the evaporative compartment and affixed at a second end to the aperture in the desiccant compartment, the combination of the vapor conduit, the evaporative region and the desiccant region with the vapor conduit forming a gas-sealed and liquid-sealed region within the lid.

In some embodiments, a portable container including an integral controlled evaporative cooling system includes: at least one storage container wall configured to form a storage container with an access aperture; at least one insulation wall positioned adjacent to an exterior surface of the storage container wall, and affixed to the exterior surface to form a vapor-sealed insulation region external to a storage region; at least one desiccant region wall positioned adjacent to an exterior surface of the at least one insulation wall and sealed to the exterior surface of the at least one insulation wall to form a vapor-sealed desiccant region at least partially surrounding an exterior of the portable container; a lid for the portable container of a size and shape to reversibly mate with an interior surface of the at least one storage container wall, the lid including an internal vapor-sealed evaporative compartment, the lid including a bendable section positioned and configured to allow reversible access to the storage container; a vapor conduit with a first end positioned within the vapor-sealed evaporative region and a second end positioned within the vapor-sealed desiccant region, the vapor conduit including a bendable section aligned with the bendable section of the lid; and a vapor control unit attached to the vapor conduit.

In some embodiments, a recharging device for a portable container including an integral controlled evaporative cooling system includes: a frame of a size and shape to secure a portable container including an integral controlled evaporative cooling system; at least one heating unit positioned adjacent to the exterior of the portable container including an integral controlled evaporative cooling system; at least one fan affixed to the frame, the fan oriented to direct air against an internal surface of the portable container including an integral controlled evaporative cooling system; and a controller operably connected to the at least one heating unit and the at least one fan, the controller capable of sending control signals to both the least one heating unit and the at least one fan.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 7 is a diagram of a method of assembly of a set of portable container sections.

DETAILED DESCRIPTION

Figure 1:
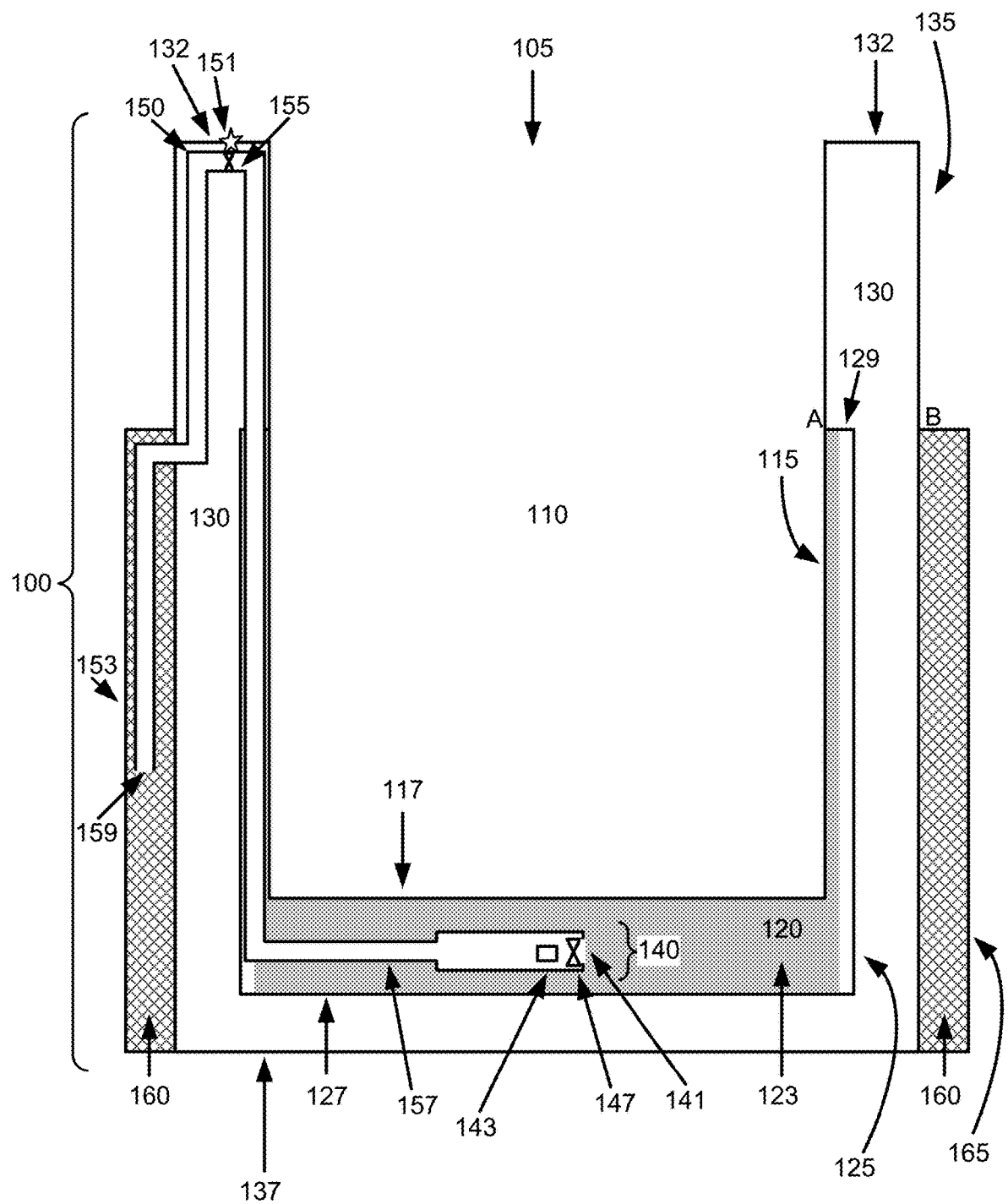
FIG. 1 is a schematic of a portable container including an integral controlled evaporative cooling system, shown in cross-section.

In the following detailed description, reference is made to the accompanying drawings, which form a part hereof. In the drawings, similar symbols typically identify similar or identical components, unless context dictates otherwise. Features of the drawings are presented for purposes of illustration and may not be drawn to scale. The illustrative embodiments described in the detailed description, drawings, and claims are not meant to be limiting. Other embodiments may be utilized, and other changes may be made, without departing from the spirit or scope of the subject matter presented here.

Portable containers described herein include controlled evaporative cooling systems integral to the container. The portable containers include evaporative cooling systems that are calibrated and controlled to maintain the interior storage regions of the containers within a predetermined temperature range over a period of time, measured in days or weeks. Portable containers with integrated evaporative cooling systems may be suitable, for example, for use with medicinal agents such as vaccines, where the storage temperature must be held in a temperature range above 0 degrees Centigrade to prevent freezing of the stored material, but below a maximum temperature required for a specific medicinal agent (e.g. 8 degrees C., 10 degrees C. or 15 degrees C.). For example, in an embodiment, a portable container with an integrated evaporative cooling system can be calibrated and controlled to maintain the interior storage region in the approved temperature range for vaccine storage (e.g. between 2 degrees C. and 8 degrees C.) for the time required to carry out an outreach medical trip in a remote region (e.g. 5 days) in an ambient temperature varying in a range between 25 degrees C. and 43 degrees C.

In some embodiments, portable containers include evaporative cooling systems that are calibrated and controlled to maintain the interior storage regions of the containers within a predetermined temperature range for at least one day (e.g. at least 24 hours). In some embodiments, portable containers include evaporative cooling systems that are calibrated and controlled to maintain the interior storage regions of the containers within a predetermined temperature range for at least 2 days (e.g. at least 48 hours). In some embodiments, portable containers include evaporative cooling systems that are calibrated and controlled to maintain the interior storage regions of the containers within a predetermined temperature range for at least 3 days (e.g. at least 72 hours). In some embodiments, portable containers include evaporative cooling systems that are calibrated and controlled to maintain the interior storage regions of the containers within a predetermined temperature range for at least 4 days (e.g. at least 96 hours). In some embodiments, portable containers include evaporative cooling systems that are calibrated and controlled to maintain the interior storage regions of the containers within a predetermined temperature range for at least 5 days (e.g. at least 120 hours). In some embodiments, portable containers include evaporative cooling systems that are calibrated and controlled to maintain the interior storage regions of the containers within a predetermined temperature range for at least 6 days (e.g. at least 144 hours). In some embodiments, portable containers include evaporative cooling systems that are calibrated and controlled to maintain the interior storage regions of the containers within a predetermined temperature range for at least 7 days (e.g. at least 168 hours). In some embodiments, an evaporative cooling system is calibrated to maintain the interior storage region of a container in a predetermined temperature range between 0 degrees Centigrade and 10 degrees Centigrade. In some embodiments, an evaporative cooling system is calibrated to maintain the interior storage region of a container in a predetermined temperature range between 2 degrees Centigrade and 8 degrees Centigrade. Portable containers with integrated evaporative cooling systems may be suitable, for example, for use with medicinal agents such as vaccines, where the storage temperature must be held in a temperature range above 0 degrees Centigrade to prevent freezing of the stored material, but below a maximum temperature required for a specific medicinal agent (e.g. 8 degrees C., 10 degrees C. or 15 degrees C.). In some embodiments, portable containers include evaporative cooling systems that are calibrated and controlled to maintain the interior storage regions of the containers within a predetermined temperature range for a period of time when the external ambient temperature has an expected high point of 25 degrees C. In some embodiments, portable containers include evaporative cooling systems that are calibrated and controlled to maintain the interior storage regions of the containers within a predetermined temperature range for a period of time when the external ambient temperature has an expected high point of 37 degrees C. In some embodiments, portable containers include evaporative cooling systems that are calibrated and controlled to maintain the interior storage regions of the containers within a predetermined temperature range for a period of time when the external ambient temperature has an expected high point of 43 degrees C.

Portable containers including controlled evaporative cooling systems, such as those described herein, do not require ice or other phase change material to maintain the interior storage region of the containers and, therefore, can be configured to operate in a range of conditions. In some embodiments, the portable container requires no external power to operate the integral controlled evaporative cooling system. In some embodiments, the portable container requires minimal power to operate and control the rate of evaporative cooling, such as a power requirement that is less than the power requirement of a standard refrigeration unit. For example, a portable container can include an electrically-operated valve or an electrical switch system. In some embodiments, the portable container includes a battery. The portable containers including controlled evaporative cooling systems, such as those described herein, can be stored for an extended period of time at ambient temperatures, and then activated or started when needed to provide controlled cooling to the interior storage region of the portable container. For example, a portable container including a controlled evaporative cooling system can be of a size and shape to be easily carried throughout a day as part of a medicinal outreach campaign, and to contain the expected number of vaccine vial doses to be used by a vaccinator during a routine session of the outreach campaign. For example, a portable container including a controlled evaporative cooling system can be of a size and shape to be easily carried throughout a day as part of a medical outreach campaign, and to contain the expected number of vaccine and medicinal treatment doses to be used by medical personnel during a scheduled day of the medicinal outreach campaign. The exterior of a portable container including a controlled evaporative cooling system can be of a size and shape to facilitate transport, such as carrying by an individual person. The interior storage region of a portable container which is maintained in a predetermined temperature range with a controlled evaporative cooling system can be of a size and shape as appropriate for one or more intended use cases. For example, in some embodiments the interior storage region has a size and shape configured to store medicinals administered by a medical outreach campaigner during an average day. For example, in some embodiments the interior storage region has a size and shape configured to store vaccines administered by a medical outreach campaigner during an average day. For example, in some embodiments the interior storage region has a volume between 1 liter and 5 liters. For example, in some embodiments the interior storage region has a volume between 1 liter and 3 liters. For example, in some embodiments the interior storage region has a volume between 2 liters and 5 liters.

The portable containers described herein are configured and fabricated to be portable, such as to be hand-carried by a single individual over a period of several hours or days. For example, in some embodiments a portable container including a controlled evaporative cooling system has a total mass less than 10 kg. For example, in some embodiments a portable container including an evaporative cooling system has a total mass less than 9 kg. For example, in some embodiments a portable container including a controlled evaporative cooling system has a total mass less than 8 kg. For example, in some embodiments a portable container including an evaporative cooling system has a total mass less than 7 kg. For example, in some embodiments a portable container including a controlled evaporative cooling system has a total mass less than 6 kg. For example, in some embodiments a portable container including a controlled evaporative cooling system has a total mass less than 5 kg.

The portable containers described herein are configured for minimal mass while maintaining functionality. For example, some embodiments of the portable containers described herein include internal walls that are positioned and configured to minimize mass. A portable container including an integral controlled evaporative cooling system is configured with a radial design to maximize the cooling effect of the evaporative region surrounding a central storage region while minimizing mass in insulation and efficiently utilizing the surface area of the exterior of the portable container to disperse heat from the exothermic reaction in the desiccant region.

In some embodiments, a portable container including an integral controlled evaporative cooling system includes: a storage container wall sealed to a storage container bottom, the storage container wall and storage container bottom positioned to form a storage container with an access aperture; an evaporative region wall sealed to an evaporative region bottom, the evaporative region wall positioned adjacent to an exterior of the storage container wall and the evaporative region bottom positioned adjacent to an exterior of the storage container bottom, a top edge of the evaporative region wall sealed to the exterior of the storage container wall at a position below a top edge of the storage container wall to form a vapor-sealed evaporative region between the evaporative region wall and the evaporative region bottom and the storage container wall and the storage container bottom; an insulation wall positioned adjacent to an exterior surface of the evaporative region wall and the storage container wall, a top of the insulation wall sealed to the exterior surface of the storage container wall at a position above the evaporative region wall to form a vapor-sealed insulation region external to the storage container and to the evaporative region; a desiccant region wall positioned adjacent to an exterior surface of the insulation wall and sealed to the exterior surface of the insulation wall to form a vapor-sealed desiccant region, the desiccant region wall positioned to form an exterior surface of the portable container; a vapor conduit with a first end positioned within the vapor-sealed evaporative region and a second end positioned within the vapor-sealed insulation region; and a vapor control unit attached to the vapor conduit.

FIG. 1 shows an external perspective of a portable container 100 with an integral controlled evaporative cooling system, according to an embodiment. The view illustrated in FIG. 1 is a cross-section view of an embodiment of a portable container 100. In the illustrated embodiment, the exterior of the portable container 100 is substantially cylindrical (see, e.g. FIG. 2) and FIG. 1 illustrates a vertical cross-section view through the interior midline. The portable container 100 with an integral controlled evaporative cooling system shown in FIG. 1 includes a central storage region 110 which is accessible through a single aperture 105 in the top of the container. In the embodiment of FIG. 1, the central storage region 110 is substantially cylindrical and each of the layers or regions of the container external to the central storage region are correspondingly cylindrical. In some embodiments, a storage container with an access aperture is cylindrical with an open top region forming the access aperture. In some embodiments, a storage container with an access aperture includes rounded edges with an open top region forming the access aperture.

The portable container with an integral controlled evaporative cooling system is configured with a radial design, the central storage region at the core, an evaporative region external to the storage region, an insulation region external to the evaporative region, and a desiccant region external to the insulation region. The portable container with an integral controlled evaporative cooling system includes internal structures in a radial design relative to each other. For example, in a horizontal cross-section, the walls forming the regions create successively-sized rings of regions around the central storage region, with correspondingly successively-sized circumferences and surface areas. The exterior wall of the desiccant region forms an exterior of the portable container, thereby maximizing the external surface area of the desiccant region relative to the other regions of the container, and maximizing the surface area available for thermal radiation to and from the desiccant region. Correspondingly, the evaporative region encircles the central storage region and therefore maximizes the surface area available for cooling of the central storage region through the integral controlled evaporative cooling system of the container.

In some embodiments, a portable container including an integral controlled evaporative cooling system includes multiple access apertures, for example access apertures of a size, shape and position for insertion and removal of materials of particular sizes and shapes within a storage region. In some embodiments, a portable container including an integral controlled evaporative cooling system includes a single access aperture. In some embodiments, a portable container includes an access aperture of a size and shape to permit a human hand to access an interior of the storage container. The portable container 100 with an integral controlled evaporative cooling system includes a storage container wall 115 sealed to a storage container bottom 117, the storage container wall 115 and storage container bottom 117 positioned to form a storage container with an access aperture 105 at the top of the storage region 110 of the storage container. The storage container wall 115 is sealed to a storage container bottom 117 with a gas-impermeable seal.

The portable container 100 illustrated in FIG. 1 includes an evaporative region wall 125 sealed to an evaporative region bottom 127. The evaporative region wall 125 is sealed to an evaporative region bottom 127 with a gas-impermeable seal. The evaporative region wall 125 is positioned adjacent to an exterior of the storage container wall 115. In the embodiment illustrated, the evaporative region wall 125 is positioned adjacent to an exterior of the storage container wall 115 so that the planes of the walls are substantially parallel. In some embodiments, as illustrated in FIG. 1, there is a evaporative edge wall 129 positioned between the evaporative region wall 125 and the storage container wall 115, the evaporative edge wall 129 sealed to each of the adjacent walls. In some embodiments, an evaporative region wall is positioned adjacent to an exterior of the storage container wall so that the planes of the walls are at an angle to each other while maintaining a gap between the adjacent surfaces of the walls. The evaporative region wall 125 is sealed to the exterior of the storage container wall 115 with a gas-impermeable seal. FIG. 1 illustrates an embodiment wherein the evaporative region bottom 127 is positioned adjacent to an exterior of the storage container bottom 117 so that the planes of the bottoms are substantially parallel. FIG. 1 also shows an evaporative edge wall 129 forming a top edge of the evaporative region wall 125 sealed to the exterior of the storage container wall 115 at a position below a top edge of the storage container wall 115. The evaporative region wall 125 sealed to an evaporative region bottom 127 and the storage container wall 115 and storage container bottom 117 form the boundaries of a vapor-sealed evaporative region 120 between the evaporative region wall 125 and the evaporative region bottom 127 and the storage container wall 115 and the storage container bottom 117. As illustrated in FIG. 1, in some embodiments the evaporative region wall 125 and the evaporative region bottom 127 are of a size, shape and position to form a gap between a surface of the evaporative region wall 125 and the evaporative region bottom 127 with the storage container wall 115 and the storage container bottom 117. In some embodiments, the evaporative region wall is formed as a cylindrical structure. In some embodiments, the evaporative region wall is formed as a structure with rounded edges.

An evaporative liquid 123 is positioned within the evaporative region 120. The evaporative region includes a partial gas pressure less than the ambient gas pressure as well as the evaporative liquid. In some embodiments, the vapor-sealed evaporative region includes: an evaporative liquid; a wick structure for the evaporative liquid; and a gas pressure less than the ambient gas pressure.

An "evaporative liquid," a used herein, is a liquid with evaporative properties under the expected temperatures and gas pressures of the interior region of an evaporative region during use of a portable container with an integral controlled evaporative cooling system. For example, in some embodiments the interior evaporative region includes a partial gas pressure of approximately 5% of atmospheric pressure external to the portable container, and the evaporative liquid within the interior evaporative region includes water. For example, in some embodiments the interior evaporative region includes a partial gas pressure of approximately 10% of atmospheric pressure external to the portable container, and the evaporative liquid within the interior evaporative region includes methanol. For example, in some embodiments the interior evaporative region includes a partial gas pressure of approximately 15% of atmospheric pressure external to the portable container, and the evaporative liquid within the interior evaporative region includes ammonia. For example in some embodiments the evaporative liquid can include additional agents to promote or reduce the evaporative potential of the evaporative liquid.

In some embodiments, the evaporative region includes a wick structure, such as a mesh or a three-dimensional porous structure with pores of a size and shape to permit the evaporative liquid to wick throughout the structure. For example, in some embodiments an evaporative region includes a metal mesh with pores of an appropriate size for the evaporative liquid in question. For example, in some embodiments an evaporative region includes a felted material with pores of an appropriate size for the evaporative liquid in question. The wick structure can be positioned and/or affixed to one or more interior surfaces of the walls forming the evaporative region.

In the embodiment illustrated in FIG. 1, an insulation wall 135 is positioned adjacent to an exterior surface of the evaporative region wall 125 and the storage container wall 115. A top of the insulation wall 135 is sealed to the exterior surface of the storage container wall 125 at a position above the evaporative region wall 125 to form a vapor-sealed insulation region 130 external to the storage region 110 and to the evaporative region 120. In some embodiments, the top edge of the insulation wall is directly sealed to the surface of the storage container wall at a position above the evaporative region wall. In some embodiments, as illustrated in FIG. 1, a top wall 132 is positioned between the insulation wall 135 and the storage container wall 115, the top wall 132 sealed to both walls to form a top edge of the storage container. In the embodiment shown in FIG. 1, each of the planes of the storage container wall 115, the evaporative region wall 125 and the insulation wall 135 are substantially parallel to each other. An insulation bottom 137 is sealed to the lower edge of the insulation wall 135. In some embodiments, the insulation wall is sealed to an insulation bottom, and the insulation bottom is positioned adjacent to an exterior of the evaporative region bottom. In some embodiments, a bottom of the insulation wall is sealed to the exterior surface of the evaporative region wall at a position adjacent to the evaporative region bottom.

The space between the walls and bottoms forms an insulation region 130 that surrounds the storage region 110 and the evaporative region 120. Depending on the embodiment, an insulation region is of a thickness (e.g. the space between point A and point B in FIG. 1) sufficient to provide the insulation required for the expected use case of the portable container. The thickness of the insulation region varies depending on factors including the type of insulation positioned within the insulation region, the expected use case of the portable container, the evaporative liquid used, and the desiccant used. For example, in some embodiments, the insulation region has an expected thermal transfer across its thickness (e.g. the space between point A and point B in FIG. 1) of approximately 2 watts in the expected use case. For example, in some embodiments, the insulation region has an expected thermal transfer across its thickness in the range of 0.5 to 2.5 watts in the expected use case. For example, in some embodiments, the insulation region has an expected thermal transfer across its thickness in the range of 1.5 to 5.5 watts in the expected use case. For example, in some embodiments, the insulation region has an expected thermal transfer across its thickness in the range of 0.5 to 6 watts in the expected use case. See Fesmire, "Standardization in Cryogenic Insulation Systems Testing and Performance Data," *Physics Procedia* 67: 1089-1097 (2015), which is incorporated here by reference. For example, in some embodiments, the insulation region includes substantially evacuated space forming an insulation layer between the evaporative region and the desiccant region. For example, in some embodiments, the insulation region includes space with a gas pressure below $10^{-3}$ Torr forming an insulation layer between the evaporative region and the desiccant region. For example, in some embodiments, the insulation region includes space with a gas pressure below $10^{-5}$ Torr forming an insulation layer between the evaporative region and the desiccant region. For example, in some embodiments, the insulation region includes at least one reflective layer in addition to substantially evacuated space. For example, in some embodiments, the insulation region includes aerogel. Since the portable container is designed to be carried for hours or days by an individual person, the insulation selected should be sufficiently low weight to maintain the portability of the container.

The portable container 100 with an integral controlled evaporative cooling system shown in FIG. 1 includes a desiccant region wall 165 positioned adjacent to an exterior surface of the insulation wall 135 and sealed to the exterior surface of the insulation wall 135 to form a vapor-sealed desiccant region 160. The desiccant region wall is positioned to form an exterior surface of the portable container. In some embodiments, the desiccant region wall encircles the exterior surface of the insulation wall around the exterior of the side walls of the portable container. In some embodiments, the desiccant region wall encircles the exterior surface of the insulation wall around the exterior of the side walls and the bottom of the portable container. In some embodiments, the desiccant region wall is sealed to a desiccant region bottom, and the desiccant region bottom is positioned adjacent to an exterior of an insulation bottom to form a desiccant region adjacent to the insulation wall and insulation bottom. During use, a gas-sealed desiccant region includes a desiccant material. When the controlled cooling function of the portable container is operational, a desiccant material within the gas-sealed desiccant region undergoes an exothermic reaction. Allowing the surface area of the exterior desiccant region wall to encircle the entire portable container maximizes the space available for radiative cooling of the vapor-sealed desiccant region during the exothermic reaction.

A desiccant material is fabricated from at least one material with desiccant properties, or the ability to remove liquid from a liquid vapor in the surrounding space. Units of desiccant material can operate, for example, through the absorption or adsorption of water from the water vapor in the surrounding space. One or more units of desiccant material selected will depend on the specific embodiment, particularly the volume required of a sufficient quantity of desiccant material to absorb liquid for the estimated time period required to operate a specific evaporative cooling unit integral to a specific container. In some embodiments, the units of desiccant material selected will be a solid material under routine operating conditions. One or more units of desiccant material can include non-desiccant materials, for example binding materials, scaffolding materials, or support materials. One or more units of desiccant material can include desiccant materials of two or more types. The portable cooling units described herein are intended for use with evaporative cooling for days or weeks, and sufficient desiccant material and corresponding evaporative liquid is included for those time periods in any given embodiment. For more information on liquid-desiccant material pairs, see: Saha et al., "A New Generation Cooling Device Employing $CaCl_2$-in-silica Gel-water System," *International Journal of Heat and Mass Transfer*, 52: 516-524 (2009), which is incorporated by reference. The selection of one or more desiccant materials for use in a specific embodiment will also depend on the target cooling temperature range in a specific embodiment. For example, in some embodiments the desiccant material can include calcium carbonate. For example, in some embodiments, the desiccant material can include lithium chloride. For example, in some embodiments, the desiccant material can include liquid ammonia. For example, in some embodiments, the desiccant material can include zeolite. For example, in some embodiments, the desiccant material can include silica. More information regarding desiccant materials is available in: Dawoud and Aristov, "Experimental Study on the Kinetics of Water Vapor Sorption on Selective Water Sorbents, Silica Gel and Alumina Under Typical Operating Conditions of Sorption Heat Pumps," *International Journal of Heat and Mass Transfer*, 46: 273-281 (2004); Conde-Petit, "Aqueous Solutions of Lithium and Calcium Chlorides:—Property Formulations for Use in Air Conditioning Equipment Design," *M. Conde Engineering*, (2009); "Zeolite/Water Refrigerators," BINE Informationsdienst, projektinfo 16/10; "Calcium Chloride Handbook: A Guide to Properties, Forms, Storage and Handling," Dow Chemical Company, (August, 2003); "Calcium Chloride, A Guide to Physical Properties," Occidental Chemical Corporation, Form No. 173-01791-0809P&M; and Restuccia et al., "Selective Water Sorbent for Solid Sorption Chiller: Experimental Results and Modelling," *International Journal of Refrigeration* 27:284-293 (2004), which are each incorporated herein by reference. In some embodiments, a desiccant material is considered non-toxic under routine handling precautions. The selection of a desiccant material is also dependent on any exothermic properties of the material, in order to retain the thermal properties of the entire portable cooling unit desired in a specific embodiment.

The portable container 100 with an integral controlled evaporative cooling system shown in FIG. 1 includes a vapor conduit 150 with a first end 157 positioned within the vapor-sealed evaporative region 120 and a second end 153 positioned within the vapor-sealed desiccant region 160. The first end 157 of the vapor conduit 150 has an aperture 141 positioned within the vapor-sealed evaporative region 120. The second end 153 of the vapor conduit 150 has an aperture 159 positioned within the vapor-sealed desiccant region 160. There is a vapor control unit 140 attached to the vapor conduit 150. In the embodiment illustrated in FIG. 1, the vapor control unit 140 is positioned at the first end 157 of the vapor conduit 150, so that the vapor control unit 140 is positioned within the vapor-sealed evaporative region 120. In some embodiments, the vapor conduit includes a hollow structure. In some embodiments, the vapor conduit includes a tubular structure. In some embodiments, a vapor conduit has a first end positioned within the vapor-sealed evaporative region and a second end positioned within the vapor-sealed desiccant region, with the center portion of the vapor conduit traversing the interior of the insulation region. In some embodiments, a vapor conduit has a first end positioned within the vapor-sealed evaporative region and a second end positioned within the vapor-sealed desiccant region, with the center portion of the vapor conduit traversing around the exterior of the insulation region (see, e.g. FIGS. 5 and 6). In some embodiments, a vapor conduit has a first end positioned within the vapor-sealed evaporative region and a second end positioned within the vapor-sealed desiccant region, with the center portion of the vapor conduit traversing a portion of the interior of the storage region as well as traversing the interior of the insulation region.

A "vapor conduit," as used herein, refers to a conduit configured for gas, including evaporative liquid in a vapor form, to move through the conduit. The vapor conduit, including the vapor control unit, is configured to control vapor flow between the interior desiccant region and the interior evaporative region. In some embodiments the vapor conduit is configured as a tubular structure traversing between adjacent units. The size, shape and placement of the vapor conduit will depend on factors including the size of the container, the temperature ranges desired for the container, the level of reversible control of vapor movement within the vapor conduit, and the physical properties of the desiccant material and the evaporative liquid utilized in a particular embodiment. The evaporative rate will depend on the configuration of the embodiment and the use case. Some embodiments include a sensor within the vapor control unit, operably connected to the controller with a wire connection. The sensor can include, for example, a temperature or pressure sensor. Some embodiments include a plurality of temperature sensors. Sensors can be, for example, affixed to a wall or bottom of the storage container, within the vapor conduit, and/or affixed to a wall or bottom of the desiccant region.

For example, in some embodiments the target temperature range of the storage region is between 0 and 10 degrees Centigrade, and the portable container with an integral controlled evaporative cooling system includes approximately 1 liter of liquid water as an evaporative liquid and a corresponding volume of desiccant material including calcium chloride to absorb greater than 1 liter of water. See "The Calcium Chloride Handbook, A Guide to Properties, Forms, Storage and Handling," DOW Chemical Company, dated August 2003, which is incorporated by reference herein. As an example, for an embodiment of a portable container with an integral controlled evaporative cooling system with water as an evaporative liquid and calcium chloride as a desiccant material, wherein the portable container begins with a substantially evacuated vapor conduit (i.e. less than or equal to 300 mTorr of pressure), it is estimated that approximately 1 gram of water will evaporate for every hour that the valve is in a fully open position. Therefore, 1 liter of water and 1.5 kg of calcium chloride can maintain the evaporative cooling unit between approximately 6 degrees Centigrade and 9 degrees Centigrade for approximately a month with an external ambient temperature of approximately 25 degrees Centigrade. As an example, for some embodiments of a portable container with water as an evaporative liquid and calcium chloride as a desiccant material, wherein the internal gas-sealed region included within the evaporative region, the vapor conduit and the desiccant region begins with a substantially evacuated interior (i.e. less than or equal to 300 mTorr of pressure), it is estimated that approximately 2-5 grams of water will evaporate for every hour that the valve is in a fully open position.

The portable container including the integral controlled evaporative cooling system includes an internal space wherein gas, vapor and liquid can reversibly move between the desiccant region and the evaporative region through the vapor conduit in a controlled manner in order to cause the appropriate cooling effect within the storage region of the container. Within the portable container, the desiccant region, the evaporative region and the vapor conduit are sealed together with a continuous vapor-sealed interior region. Gas, vapor and liquid flow through the continuous vapor-sealed interior region is controlled through a vapor control unit. The continuous vapor-sealed interior region includes a gas pressure less than the ambient gas pressure adjacent to an exterior of the portable container. The gas pressure utilized in an embodiment depends on factors including the evaporative liquid and desiccant used in the embodiment, the cooling temperature desired and the materials used in fabrication of the portable container.

FIG. 1 illustrates an embodiment with a vapor control unit 140 attached to the vapor conduit 150. In some embodiments, a vapor control unit includes: a valve of a size, shape and position to reversibly inhibit flow of gas through the vapor conduit; and a controller operably attached to the valve. In some embodiments, a vapor control unit includes: a temperature sensor attached to the storage container; a valve of a size, shape and position to reversibly inhibit flow of gas through the vapor conduit in a continual manner; and a controller operably attached to the valve. In the embodiment illustrated in FIG. 1, the vapor control unit 140 is affixed to the first end 157 of the vapor conduit 150. The vapor control unit 140 includes a valve 147 of a type, size, shape and position to reversibly inhibit the flow of gas between the interior of the evaporative region 120 and the interior of the vapor conduit 150. The valve 147 is positioned adjacent to an aperture 141 in the vapor control unit 140, the aperture providing a conduit between the evaporative region 120 and the interior of the vapor control unit 140.

A valve within the vapor conduit is configured to reversibly control the flow of gas, including vapor, through the vapor conduit. In some embodiments, the vapor control unit includes a valve configured to restrict the transfer of gas between the first end of the vapor conduit and the second end of the vapor conduit. In some embodiments, the valve includes at least one movable valve with at least a first position substantially closing the at least one movable valve to vapor flow through the at least one movable valve, and a second position substantially opening the at least one movable valve to vapor flow through the at least one movable valve. Some embodiments include a movable valve with at least a first position substantially closing vapor flow through the vapor control unit, at least one second position substantially permitting flow of vapor through the vapor control unit to the maximum permitted by the diameter of the vapor control unit, and at least one third position restricting vapor flow through the vapor control unit. In some embodiments, the valve includes a mechanical valve. In some embodiments, the valve includes a gate valve. In some embodiments, the valve includes rotary valve, such as a butterfly valve. In some embodiments, the valve includes a ball valve. In some embodiments, the valve includes a piston valve. In some embodiments, the valve includes a globe valve. In some embodiments, the valve includes a plurality of valves operating in tandem with each other. In some embodiments, the valve includes an electronically-controlled valve. In some embodiments, the valve includes a mechanically-controlled valve.

The selection of the valve in a given embodiment depends on, for example, cost, weight, the sealing properties of a type of valve, the estimated failure rate of a type of valve, the durability of a type of valve under expected use conditions, and the power consumption requirements for a type of valve. The selection of the valve in a given embodiment also depends on the level of restriction of gas flow, including vapor flow, through a particular type of valve when the valve is in a fully open position. Some embodiments include an on-off valve positioned and oriented to block the flow of gas through the vapor conduit for an extended period of time (e.g. during storage of the device) and then to permit the flow of gas in response to input from a user (e.g. pushing a button). The on-off valve can be a manual valve with two possible states, open and closed. Some embodiments include a vapor control unit with a mechanical valve, such as one operably linked to a mechanical thermostat, such as a bimetallic coil. Some embodiments include a vapor control unit with an electronically controlled valve.

Some embodiments include a controller with the vapor control unit. For example, the embodiment illustrated in FIG. 1 includes a controller 143 positioned adjacent to the valve 147. The controller is operably connected to the valve.

The valve is operably connected to the controller, and configured to be responsive to the controller. The valve can include an electronically controlled valve. The controller can be configured to respond to one or more sensors by acting to alter the position of the valve. For example, the controller can be configured to respond in a specific manner depending on the temperature detected by one or more sensors. For example, a controller can be configured to respond to a temperature reading from a temperature sensor that is above a threshold temperature value by the controller acting to cause an opening of the valve. For example, a controller can be configured to respond to a temperature reading below a threshold temperature value from a temperature sensor by acting to cause closure of the valve. For example, a controller can be configured to respond to a temperature within a temperature range by acting to cause partial opening of the valve. For example, a controller can be configured to respond to a temperature within a temperature range by acting to cause partial closure of the valve. For example, the controller can be configured to respond in a specific manner depending on the gas pressure within the vapor control unit detected by the one or more sensors. The gas pressure can correlate with the rate of evaporation of the evaporative liquid, for example.

Different types of controllers can be utilized, depending on the embodiment. For example, a controller can be an electronic controller. In some embodiments, a controller is an electronic controller that accepts data from a plurality of temperature sensors and initiates action by the valve after determination of an average temperature from the accepted data. An electronic controller can include logic and/or circuitry configured to create a bounded or threshold system around a particular range of values from one or more sensors, such as a bounded system around a range of 3 degrees Centigrade to 7 degrees Centigrade, responsive to data from one or more temperature sensors. For example, in some embodiments a controller is a "bang-bang" controller operably attached the valve and configured to be responsive to a temperature sensor that includes a thermocouple. An electronic controller can include logic and/or circuitry configured to create a feedback system around a particular range of values from one or more sensors, such as a feedback system around a range of 2 degrees Centigrade to 8 degrees Centigrade, responsive to data from one or more temperature sensors. In some embodiments, a battery is attached to an electronic controller. In some embodiments, an external power source, such as a solar panel affixed to the exterior of the container, is attached to an electronic controller. In some embodiments, a controller is an electronic controller that accepts data from a plurality of temperature sensors and initiates action by the valve after determination of an average temperature from the accepted data. In some embodiments a controller is a mechanical controller. For example, in some embodiments the controller is attached to a Bourdon tube operably connected to the valve, and configured to respond to changes in vapor pressure associated with temperature differences. Embodiments including a mechanical controller can also include a connector that forms an operable connection between the controller and the valve that is a mechanical connector. For example, a mechanical connector can be a connector configured to transmit physical pressure, such as through operation of one or more rods or cogs, between the controller and the valve.

During use of the container, a temperature sensor can transmit data to the controller via a wire. The controller is configured to operably control the vapor control unit in response to the received data. In embodiments including an electronic controller, the electronic controller receives data from one or more temperature sensors and/or gas pressure sensors, and determines if the detected values are outside or inside of a predetermined range. Depending on the determination, the electronic controller can initiate the valve to open or close to return the temperature or pressure to the predetermined range of values. For example, in some embodiments, if the electronic temperature sensor sends a signal including temperature data at 9 degrees Centigrade, the controller will determine that the received temperature data is outside of the predetermined range of 3 degrees Centigrade to 7 degrees Centigrade. In response to the determination, the controller will send a signal to a motor attached to a valve within the vapor control unit, the signal of a type to initiate the motor to open the valve. As another example, in some embodiments, if the electronic temperature sensor sends a signal including temperature data at 1 degree Centigrade, the controller will determine that the received temperature data is outside of the predetermined range of 3 degrees Centigrade to 7 degrees Centigrade. In response to the determination, the controller will send a signal to a motor attached to a valve within the vapor control unit, the signal of a type to initiate the motor to close the valve.

In some embodiments, an electronic controller can accept a plurality of gas pressure data points from one or more gas pressure sensors, and calculate a gas pressure result, such as an average gas pressure, or a mean gas pressure, from the accepted data. The electronic controller can then determine if the gas pressure result is outside or inside of a predetermined gas pressure range for the specific portable cooling unit. For example, gas pressure out of a specific, predetermined range can indicate an excess of evaporation of the evaporative liquid, resulting in excess evaporative cooling for the specific portable cooling unit. For example, gas pressure out of a specific, predetermined range can indicate a lack of absorption or adsorption by the desiccant material, indicating that the desiccant material needs to be refreshed or renewed. The gas pressure range is relative to the internal dimensions of the evaporative cooling unit, the conduits, the vapor control unit and the desiccant region for an embodiment. The gas pressure range is also relative to the type of evaporative liquid, the type of desiccant material, and the predetermined temperature range for cooling in an embodiment. See: Dawoud and Aristov, "Experimental Study on the Kinetics of Water Vapor Sorption on Selective Water Sorbents, Silica Gel and Alumina Under Typical Operating Conditions of Sorption Heat Pumps," *International Journal of Heat and Mass Transfer,* 46: 273-281 (2004); Marquardt, "Introduction to the Principles of Vacuum Physics," CERN Accelerator School, (1999); Kozubal et al., "Desiccant Enhanced Evaporative Air-Conditioning (DEVap): Evaluation of a New Concept in Ultra Efficient Air Conditioning," NREL Technical Report NREL/TP-5500-49722 (January 2011); Conde-Petit, "Aqueous Solutions of Lithium and Calcium Chlorides:—Property Formulations for Use in Air Conditioning Equipment Design," *M. Conde Engineering,* (2009); "Zeolite/Water Refrigerators," BINE Informationsdienst, projektinfo 16/10; "Calcium Chloride Handbook: A Guide to Properties, Forms, Storage and Handling," Dow Chemical Company, (August, 2003); "Introduction of Zeolite Technology into Refrigeration Systems: Layman's Report," Domestic project LIFE04 ENV/LU/000829; Rezk and Al-Dadah, "Physical and Operating Conditions Effects on Silica Gel/Water Adsorption Chiller Performance," *Applied Energy* 89: 142-149 (2012); Saha et al., "A New Generation Cooling Device Employing $CaCl_2$-in-silica Gel-water System," International Journal of Heat and Mass Transfer 52: 516-524 (2009); "An Introduction to Zeolite Molecular Sieves," UOP Company Brochure 0702 A 2.5; and "Vacuum and Pressure Systems Handbook," Gast Manufacturing, Inc., which are each incorporated by reference. An equation to calculate the pressure loss in vacuum lines with water vapor is available from GEA Wiegand, a copy accessed at the company website (http://produkte.gea-wiegand.de/GEA/GEACategory/139/index_en.html) on Mar. 13, 2013 is incorporated herein by reference.

Although a connection is not illustrated in FIG. 1 between the controller 143 and the valve 147 within the vapor control unit 140, an operable connection exists between the controller 143 and the valve 147. In some embodiments the controller is a mechanical controller such as a bimetallic coil. For example, in some embodiments, the operable connection includes a connector configured to transmit physical pressure, such as a rod or cog. In some embodiments the controller is an electronic controller. For example, in some embodiments, the operable connection includes a connector configured to transmit electronically, such as through a wire or wireless connection, such as through an IR or short wavelength radio transmission (e.g. Bluetooth).

In some embodiments, the vapor control unit is connected to a visible indicator of information from the controller on the outside of the portable container. For example, in some embodiments the vapor control unit includes a controller connected to an external dial, the dial configured to indicate the temperature reading from the sensor. For example, some embodiments include an exterior light connected to the controller, wherein the controller turns the light on and off in combination with sending a control signal to the valve within the vapor control unit. For example, some embodiments include a light connected to the controller, wherein the controller turns the light on and off in response to data from a pressure sensor attached to the controller. For example, the controller can include circuitry that initiates the light to turn on when information from the pressure sensor indicates that the pressure inside the evaporative cooling system is within a preset range (e.g. to indicate to a user that the internal gas pressure is within a preset acceptable operating range, and therefore is operational, or to indicate to a user that the internal gas pressure is outside of the preset acceptable operating range, and therefore requires maintenance).

Some embodiments include a display unit operably attached to the vapor conduit, such as directly to a sensor within the vapor conduit. A display unit can include, for example, a light, a screen display, an e-ink display or a similar device affixed to the exterior of the portable container. The display unit can, for example, be operably connected to the controller and configured to receive signals from the controller indicating conditions regarding the interior of the portable container. For example, in embodiments including a light as a display unit, the controller can be configured to make a transmission to the light, initiating the light to switch on when data accepted from the temperature sensor indicates that the interior temperature of the storage region within a portable container is within a preset temperature range. For example, in embodiments including a screen display, the controller can be configured to transmit data regarding the conditions of the portable container to the screen display, such as the most recent internal temperature reading(s), or the position of the valve. Some embodiments include a user input device, such as a push-button, a touch sensor, or a keypad. The user input device can be operably attached to the controller. For example, the controller may be configured to respond to a specific user input, as transmitted by a user input device, by opening the valve within the vapor conduit. For example, the controller may be configured to respond to a specific user input, as transmitted by a user input device, by initiating a display of the most recent temperature data on an attached screen display.

In some embodiments, a portable container including the integral controlled evaporative cooling system includes an on-off or shutoff switch positioned and configured to permit a user of the portable container to turn the integral controlled evaporative cooling system on and off as required. For example, a portable container including the integral controlled evaporative cooling system can include: a shutoff valve of a size, shape and position to reversibly fully inhibit flow of gas through the vapor conduit; and a switch operably attached to the valve, the switch positioned to cause the valve to fully open and fully close in response to an external action on the switch. For example, a shutoff switch may be useful in embodiments wherein the portable container is intended for storage over prolonged periods of time between uses, such as months or years. A user can place the portable container including an integral controlled evaporative cooling system in storage for period of time, such as weeks, months or years, with the vapor conduit closed by the shutoff valve to turn off the controlled evaporative cooling system within the container. The user can switch on the integral controlled evaporative system on with the on-off switch when the user has need of the container, thereby opening the shutoff valve and restarting the controlled evaporative cooling system within the container. In the embodiment illustrated in FIG. 1, there is a binary switch 151 attached to a shutoff valve 155 on the vapor conduit 150, the binary switch 151 positioned adjacent to the exterior of the portable container in a position accessible to a user of the portable container. In some embodiments, an on-off switch includes a mechanical screw affixed to a valve positioned to reversibly inhibit the flow of gas and vapor through the vapor conduit. In some embodiments, an on-off switch includes a reversibly depressible button switch operably attached to a valve positioned to reversibly inhibit the flow of gas and vapor through the vapor conduit. In some embodiments, a shutoff valve is connected to an electronic on-off switch.

Figure 2:
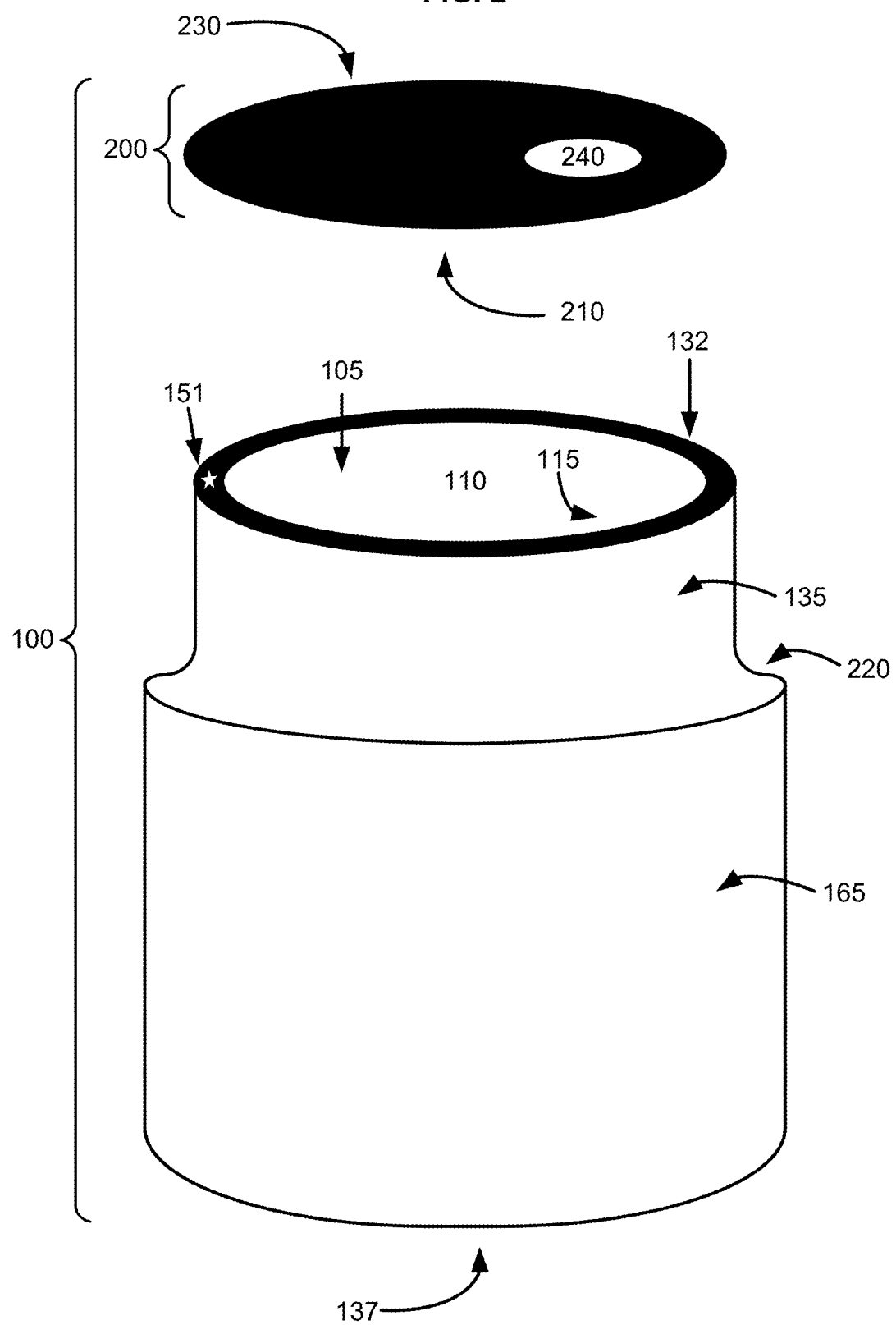
FIG. 2 is a schematic of a portable container including an integral controlled evaporative cooling system.

FIG. 2 illustrates an external view of an embodiment of a portable container 100 including an integral controlled evaporative cooling system. The portable container 100 is substantially cylindrical. The embodiment of the portable container 100 shown in FIG. 2 includes a desiccant region wall 165 positioned to form an external surface of the portable container 100. An insulation bottom 137 forms the lower face of the portable container 100. An insulation wall 135 projects above the desiccant region wall 165, the insulation wall 135 also forming an external surface of the portable container 100. An external edge 220 is visible joining the insulation wall 135 with the desiccant region wall 165. The portable container 100 includes a top edge 132 between the exterior insulation wall 135 and the interior storage container wall 115. A storage region 110 is positioned centrally within the portable container 100, the sides of the storage region 110 formed by the interior storage container wall 115. A binary on-off switch 151 is positioned on the top edge 132 of the portable container 100.

The portable container 100 illustrated in FIG. 2 is shown with a lid 200. The lid 200 includes a bottom surface 210 which is of a size and shape to reversibly mate with the top face of the body of the portable container, and to cover the aperture 105 in the body of the portable container. In some embodiments, a lid includes insulation sufficient to reduce the heat transfer into a storage region in conjunction with the insulation of the insulation region of the storage container. In some embodiments, a lid can include a bottom facing projection of a size and shape to reversibly mate with the top edge of an access aperture in a storage container, and an adjacent ridge section to reversibly mate with the top of the walls of the storage container. The lid 200 includes a top surface 230. A display unit 240 is attached to the top surface 230 of the lid 200. A display unit can, for example, be wirelessly connected to a controller within the portable container, wherein the controller is connected to a temperature sensor. A display unit can, for example, be configured to display information such as the temperature reading from a sensor affixed to the storage region. In some embodiments, a display unit includes a user interface, such as a touchscreen, and is configured to send control signals to the controller. For example, a display unit that includes a touchscreen can be configured to send "on" and "off" signals to the controller.

In some embodiments, a portable container includes handles of a size and shape to improve portability for a user of the container. In some embodiments, a portable container includes external features to improve durability, such as shock-dampening bumpers or edge covers.

Figure 3:
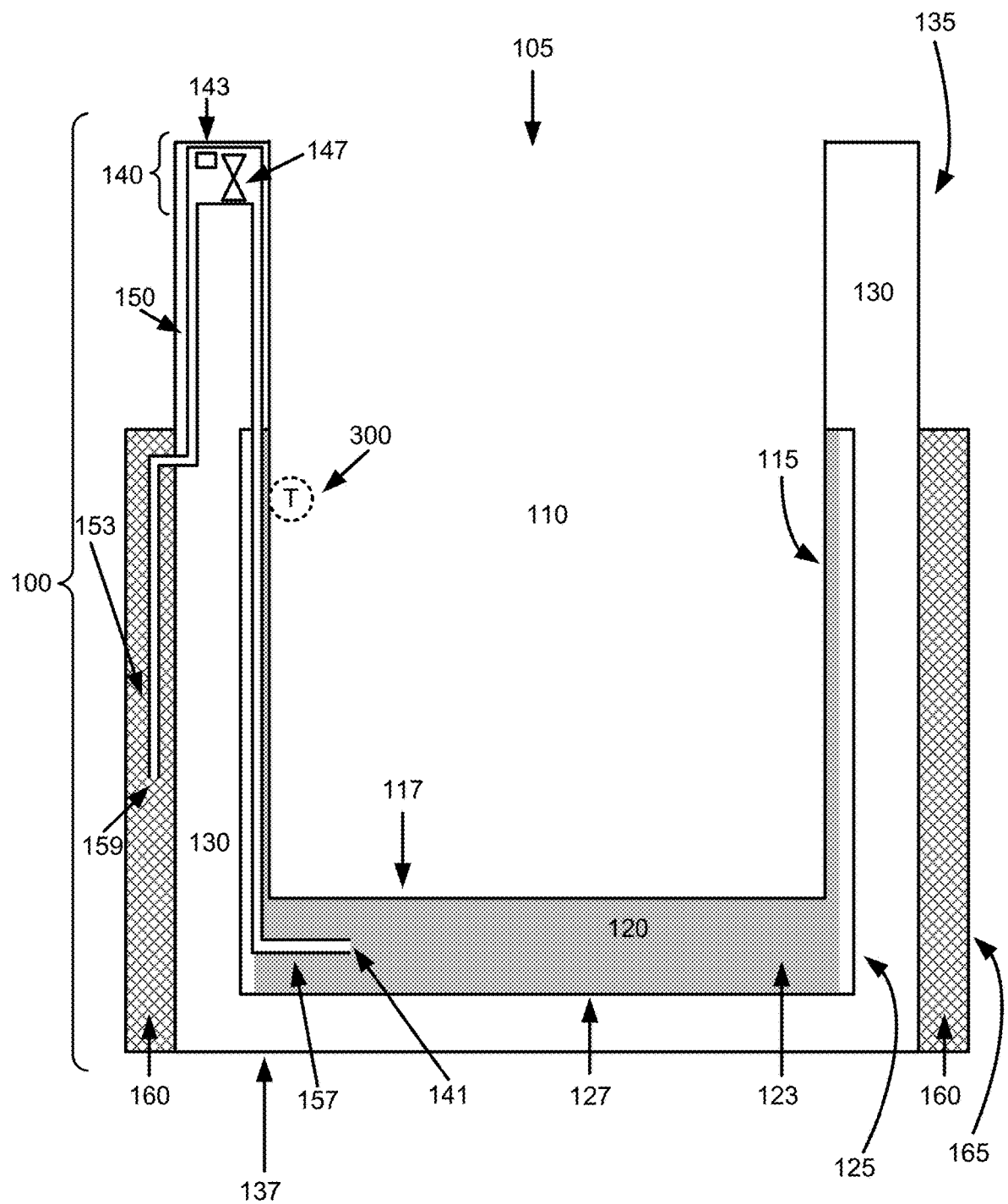
FIG. 3 is a schematic of a portable container including an integral controlled evaporative cooling system, shown in cross-section.

FIG. 3 illustrates aspects of an embodiment of a portable container 100 including an integral controlled evaporative cooling system. The embodiment includes storage container wall 115 sealed to storage container bottom 117, forming the sides and bottom of a storage region 110 with a top access aperture 105. An evaporative region wall 125 and bottom 127 are correspondingly positioned to form a gas-sealed and vapor-sealed evaporative region 120 adjacent to the exterior face of the storage container, on the opposite face of the storage container wall 115 and the storage container bottom 117 from the storage region 110. An evaporative liquid 123 is positioned within the evaporative region, which can also include a wick structure to maximize contact of the evaporative liquid 123 with the surface area of the storage container wall 115.

An insulation wall 135 and an insulation bottom 137 are positioned adjacent to the storage container wall 115 and the storage container bottom 117 as well as the evaporative region wall 125 and evaporative region bottom 127 in the embodiment of FIG. 3. The evaporative region wall 125 and evaporative region bottom 127 are sealed with a gas-impermeable and vapor-impermeable seal to each other and to the top edge of the storage container wall 115 to form a gas-sealed insulation region 130. In the embodiment illustrated, the insulation region 130 includes substantially evacuated space of a size, internal gas pressure and thickness to sufficiently insulate the storage region 110 during the expected usage of the portable container 100.

The embodiment of a portable container 100 including an integral controlled evaporative cooling system shown in FIG. 3 includes a desiccant wall 165 positioned adjacent to the exterior surface of the insulation wall 135. The desiccant wall 165 is positioned to form an external surface of the portable container 100, with a surface area sufficient to radiate the expected heat of the exothermic chemical reaction of the desiccant material within the desiccant region 160 during the expected use of the container 100. The desiccant region 130 is a gas-sealed and vapor-sealed region within the container 100, adjacent to the exterior of the container 100, and positioned to allow maximum heat loss from the desiccant region 160 and its internal desiccant material.

FIG. 3 also illustrates that the portable container 100 including an integral controlled evaporative cooling system includes a vapor conduit 150 with a first end 157 positioned within the evaporative region 120 and a second end 159 positioned within the desiccant region 160. The interior of the vapor conduit 150, the interior of the evaporative region 120 and the interior of the desiccant region 160 are sealed to each other with gas-impermeable seals to form a continuous vapor-sealed interior region within the container. The vapor conduit 150 includes a single aperture 141 at the first end 157 positioned within the evaporative region 120. The vapor conduit 150 includes a single aperture 159 at the second end 153 positioned within the desiccant region 160. In the embodiment depicted in FIG. 3, the vapor conduit 150 includes a middle section that is positioned within the insulation region 130, however the interior of the vapor conduit 150 and the interior of the insulation region 130 are separated from each other by the gas-impermeable walls of the vapor conduit 150.

The vapor conduit 150 includes a vapor control unit 140 positioned in a central location along the length of the vapor conduit 150. The vapor control unit 140 includes a valve 147 of a size, shape and position to reversibly completely inhibit gas flow through the vapor conduit 150, and to incrementally control gas flow through the vapor conduit 150 by opening and closing in response to signals received from the controller 143. In the embodiment illustrated, a temperature sensor 300 is affixed to the storage container wall 115, the temperature sensor 300 operably connected to the controller 143. The controller can, for example, include circuitry configured to send a signal to the valve within the vapor control unit in response to signals received from a temperature sensor. For example, a controller can be configured to send a signal for opening completely or partially to the valve in response to the receipt of a signal from a temperature sensor that is above a preset value. For example, a controller can be configured to send a signal for closing completely or partially to the valve in response to the receipt of a signal from a temperature sensor that is below a preset value. In some embodiments, a controller is operably attached to a valve and/or one or more sensors with a wired connection. In some embodiments, a controller is operably attached to a valve and/or one or more sensors with a wireless connection.

The temperature sensor 300 is affixed to the storage container wall 115, at a position to evaluate the temperature of the storage region 110. In some embodiments, a temperature sensor is affixed to the storage container wall at a position within the evaporative region and adjacent to the storage region. Some embodiments include a pressure sensor positioned within one or more of the evaporative region, the vapor conduit, and/or the desiccant region, the pressure sensor operably connected to a controller within a vapor control unit.

Some embodiments include a sensor that is a temperature sensor. A temperature sensor can include, for example, a mechanical temperature sensor. A temperature sensor can include, for example, an electronic temperature sensor. By way of example, some embodiments include a sensor that is a temperature sensor including one or more of: a thermocouple, a bimetallic temperature sensor, an infrared thermometer, a resistance thermometer, or a silicon bandgap temperature sensor.

Some embodiments include a sensor that is a gas pressure sensor. A gas pressure sensor can include, for example, a mechanical gas pressure sensor, such as a Bourdon tube. A gas pressure sensor can include an expansion valve with a capillary tube. A gas pressure sensor can include, for example, an electronic gas pressure sensor. By way of example, some embodiments include a sensor that is a vacuum sensor. For example, the interior of a vapor conduit can be substantially evacuated, or at a low gas pressure relative to atmospheric pressure, before use of a container and then the vacuum reduced during evaporation from the evaporative liquid. Data from a vacuum sensor can, therefore, be indicative of the rate of evaporation, or the total level of evaporation of the evaporative liquid within the container. In some embodiments, a gas pressure sensor can include a piezoresistive strain gauge, a capacitive gas pressure sensor, or an electromagnetic gas pressure sensor. In some embodiments, a pressure sensor includes a capacitance pressure sensor.

Some embodiments include: a temperature sensor attached to the storage container; a heating element positioned adjacent to the storage container wall or the storage container bottom; and a controller connected to the temperature sensor, the vapor control unit, and the heating element. For example, in some situations a portable container including an integral controlled evaporative cooling system may be stored in a location that has an ambient temperature below the expected use of a storage region, and the storage container wall and/or bottom will need to be heated to the appropriate minimum temperature prior to use. For example, a portable container may be stored in an unheated storage building during winter (e.g. ambient temperature −5 degrees C. to −10 degrees C.), while the container can be calibrated with a storage region in the 2 degree C. to 8 degree C. range.

Some embodiments include an internal recharging system including: a temperature sensor affixed to the portable container; a heating element positioned within or adjacent to the vapor-sealed desiccant region; and a controller connected to the temperature sensor and the heating element. The controller can also, in some embodiments, be attached to the vapor control unit. As discussed further herein, the portable container is designed to be rechargeable, such as through heating the desiccant within the desiccant region to release the evaporative liquid in vapor form back through the vapor conduit to the evaporative region. This heating should be to a predetermined temperature for a predetermined period of time, depending on the desiccant and the evaporative liquid in use in an embodiment. In some embodiments, there is an external recharging device, as described further herein. In some embodiments, there is an internal recharging system, including a temperature sensor, a heating element positioned within or adjacent to the vapor-sealed desiccant region, and a controller connected to the temperature sensor and the heating element. The controller can, for example, include circuitry to activate a predetermined sequence of events when recharging is warranted. The controller can be attached and responsive to a user interface, such as a touchscreen or switch to activate the recharging sequence of events. In some embodiments, a controller includes circuitry to initiate a recharging sequence in response to a signal from the user interface. A recharging sequence can include, for example, the controller sending an activation signal to the heating element, and receiving a signal with temperature information from the temperature sensor. The controller can also, in response to the temperature data received from the temperature sensor, send a further activation or deactivation signal to the heating element. The controller can further send a signal to a user interface, such as a signal of a type to turn on a warning light or display on a user interface.

Some embodiments include a set of portable container sections for assembly, including: a storage container with an integrated evaporative cooler, including an interior storage container positioned with an access aperture at an upper region of the interior storage container, an outer storage container positioned with an access aperture at an upper region of the interior storage container, the outer storage container sealed to the interior storage container at a position adjacent to the access aperture to form an vapor-sealed evaporative region between the interior storage container and the outer storage container, and an evaporative section of a vapor conduit, the evaporative section including a first end positioned within the vapor-sealed evaporative region and a second end positioned at an upper region of the storage container with an aperture external to the storage container; a desiccant section including an insulation unit with an interior surface of a size and shape to mate with an exterior surface of the storage container, and of a size and shape to extend beyond the access aperture of the storage container, a desiccant region wall encircling the insulation unit, the desiccant region wall sealed to an exterior of the insulation unit with a vapor-impermeable seal to form a desiccant region exterior to the insulation unit, and a desiccant section of a vapor conduit, the desiccant section including a first end positioned within the desiccant region and a second end positioned at an upper region of the desiccant section with an aperture external to the desiccant section; and a central vapor conduit section, including a first end of a size and shape to mate and seal with the second end of the evaporative section of the vapor conduit, a second end of a size and shape to mate and seal with the second end of the desiccant section of the vapor conduit, and a connector section of the central vapor conduit positioned between the first end of the central vapor conduit and the second end of the central vapor conduit, the connector section of a size and shape to position the first end to mate and seal with the second end of the evaporative section and position the second end to mate and seal with the second end of the desiccant section; wherein the vapor conduit includes an attached vapor control unit and wherein the evaporative section, the desiccant section and the central vapor conduit section are each of a size and shape to fit together into a continuous vapor-sealed interior region of an integrated portable container including a controlled integral controlled evaporative cooling system.

Figure 4:
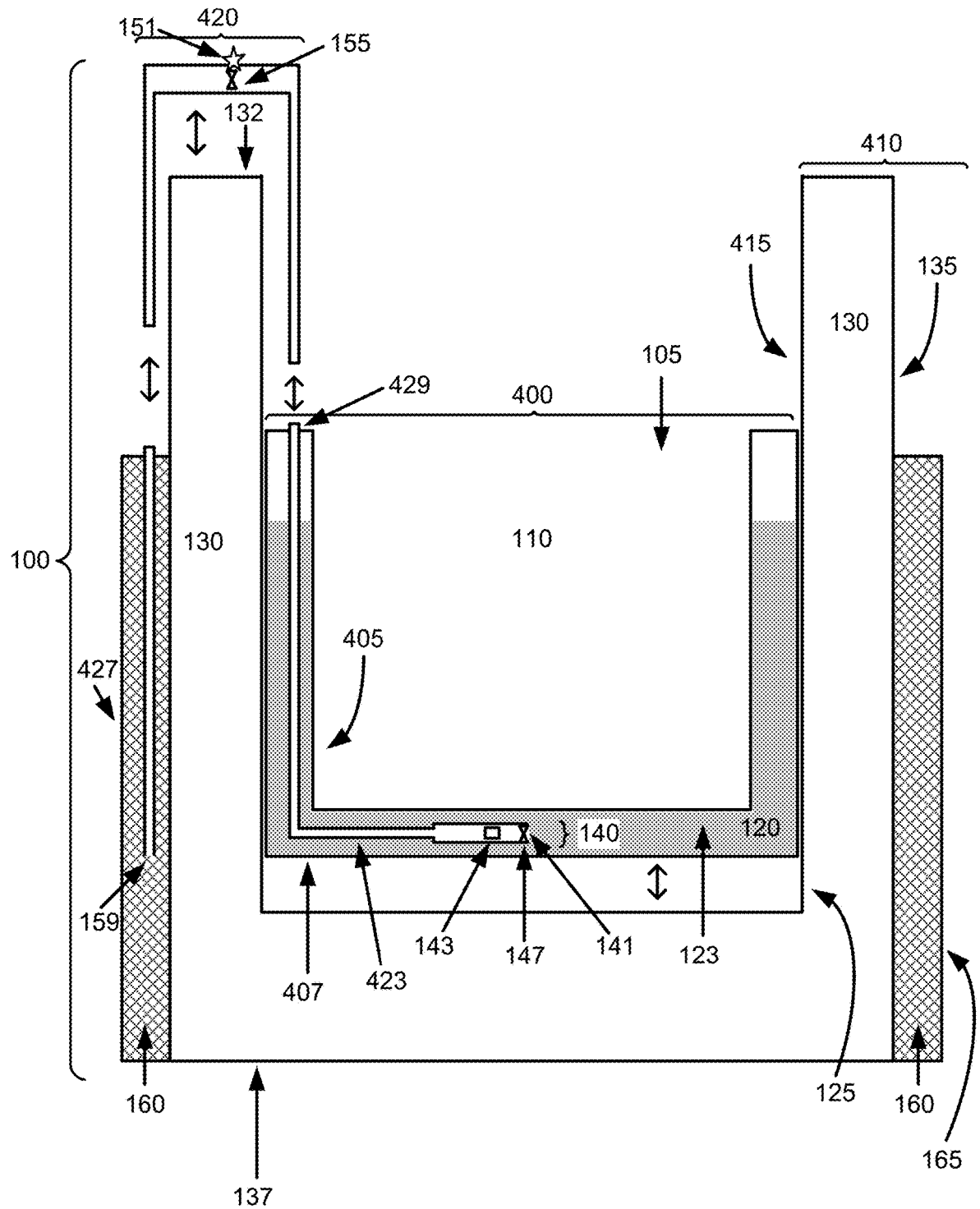
FIG. 4 is a schematic of a portable container including an integral controlled evaporative cooling system, shown in cross-section during assembly.

FIG. 4 depicts aspects of a set of portable container sections for assembly. The set of portable container sections are depicted in cross-section to illustrate interior aspects of the set of portable container sections. Once assembled, the set of portable container sections form a portable container 100 including an integral controlled evaporative cooling system such as those described herein.

At the center region of the cross-section view shown in FIG. 4, a storage container 400 with an integrated evaporative cooler includes an interior storage container 405 positioned with an access aperture 105 at an upper region of the interior storage container 405. The interior storage container 405 substantially forms the exterior of a storage region 110. The storage container with an integrated evaporative cooler 400 also includes an outer storage container 407 positioned with an access aperture at an upper region of the interior storage container 405. Some embodiments include a single access aperture in the interior and outer storage containers. Some embodiments include an access aperture of a size and shape to permit a human hand to access an interior of the interior storage container. The outer storage container 407 is sealed to the interior storage container 405 at a position adjacent to the access aperture 105 to form a vapor-sealed evaporative region 120 between the interior storage container 405 and the outer storage container 407. Some embodiments include a gas-impermeable seal between the inner storage container and the outer storage container. Some embodiments include a vapor-sealed gap between the inner storage container and the outer storage container. An evaporative liquid 123 is positioned within the vapor-sealed evaporative region 120. In some embodiments, an evaporative region includes: an evaporative liquid, a wick structure for the evaporative liquid; and a gas pressure less than the ambient gas pressure once the container has been assembled. Also within the vapor-sealed evaporative region 120 is positioned an evaporative section 423 of a vapor conduit, the evaporative section 423 including a first end positioned within the vapor-sealed evaporative region 120 and a second end positioned at an upper region of the storage container with an aperture 429 external to the storage container 400. Some embodiments include a gas-impermeable seal between the second end of the evaporative section of the vapor conduit and the storage container.

In some embodiments, the storage container with an integrated evaporative cooler is cylindrical with an open top region forming an access aperture. See, e.g. FIG. 2. In some embodiments, the storage container with an integrated evaporative cooler includes a cylindrical structure. In some embodiments, the storage container with an integrated evaporative cooler includes a structure with rounded edges. In some embodiments, the vapor-sealed evaporative region 120 includes: an evaporative liquid. In some embodiments, the vapor-sealed evaporative region 120 includes: an evaporative liquid; a wick structure for the evaporative liquid; and a gas pressure less than the ambient gas pressure.

In the embodiment illustrated in FIG. 4, a vapor control unit 140 is affixed to the first end of the evaporative section 423 of the vapor conduit positioned within the vapor-sealed evaporative region 120. The vapor control unit 140 has an aperture 141 to the vapor-sealed evaporative region 120, and a valve 147 positioned adjacent to the aperture 141. The valve 147 is of a size, shape, type and position to reversibly inhibit gas flow though the aperture 141. A controller 143 is operably connected to the valve 147. The evaporative region of the storage container 400 includes a vapor-sealed gap between the inner storage container 405 and the outer storage container 407, wherein the vapor control unit 140 and the first end of the evaporative section 423 are positioned within the gap. A gas-impermeable seal surrounds the end of the evaporative section 423 of the vapor conduit where it traverses the wall of the storage container 400.

The embodiment illustrated in FIG. 4 includes a desiccant section 410, including an insulation unit with an interior surface 415 of a size and shape to mate with an exterior surface of the storage container 400, and of a size and shape to extend beyond the access aperture 105 of the storage container 400. The insulation unit includes an outer wall 135 and a bottom 137 as well as an inner wall with an interior surface 415 of a size and shape to mate with an exterior surface of the storage container 400. The walls and bottom are sealed to each other at their respective edges with gas-impermeable seals. In the embodiment illustrated in FIG. 4, there is a top edge 132 included in the seal between the top edge of the outer wall 135 and the top edge of the inner wall. A gap between the outer wall 135 and bottom 137 and the inner wall form a vapor-sealed insulation region 130. In some embodiments, a vapor-sealed insulation region includes insulation with thermal properties sufficient to reduce the heat transfer between the evaporative region and the desiccant region for the specific use case. For example, in some embodiments, the insulation region has an expected thermal transfer across its thickness of approximately 2 watts in the expected use case. For example, in some embodiments, the insulation region has an expected thermal transfer across its thickness in the range of 0.5 to 2.5 watts in the expected use case. For example, in some embodiments, the insulation region has an expected thermal transfer across its thickness in the range of 1.5 to 5.5 watts in the expected use case. For example, in some embodiments, the insulation region has an expected thermal transfer across its thickness in the range of 0.5 to 6 watts in the expected use case. In some embodiments, a vapor-sealed insulation region of an insulation unit includes substantially evacuated space. In some embodiments, a vapor-sealed insulation region of an insulation unit includes a gas pressure below $10^{-3}$ Torr. In some embodiments, a vapor-sealed insulation region of an insulation unit includes a gas pressure below $10^{-5}$ Torr.

As shown in FIG. 4, the desiccant section 410 includes a desiccant region wall 165 encircling the insulation unit, the desiccant region wall 165 sealed to an exterior of the insulation unit with a vapor-impermeable seal to form a desiccant region 160 exterior to the insulation unit, and a desiccant section 427 of a vapor conduit including a first end positioned within the desiccant region 130 and a second end positioned at an upper region of the desiccant region 130 with an aperture external to the desiccant region 130. In some embodiments, the desiccant section completely encircles the exterior circumference of the insulation wall 135 in order to disperse the heat produced by the exothermal reaction of the desiccant material within the desiccant region during use of the storage container.

The embodiment shown in FIG. 4 also includes a central vapor conduit connector section 420, including: a first end of a size and shape to mate and seal with the second end of the evaporative section 423 of the vapor conduit, a second end of a size and shape to mate and seal with the second end of the desiccant section 427 of the vapor conduit, and a connector section 420 positioned between the first end of the central vapor conduit and the second end of the central vapor conduit, the connector section of a size and shape to position the first end to mate and seal with the second end of the evaporative section 423 and position the second end to mate and seal with the second end of the desiccant section 427. In the embodiment illustrated in FIG. 4, the central vapor conduit connector section 420 is of a size and shape to connect the desiccant section 427 and the evaporative section 423 When the set of portable container sections for assembly are sealed to each other in the final assembly, the vapor conduit includes an attached vapor control unit and the evaporative section 423, the desiccant section 427 and the central vapor conduit section 420 are each of a size and shape to fit together into a continuous vapor-sealed interior region of the integrated portable container to form a controlled integral controlled evaporative cooling system. The assembled storage container includes regulated cooling of the storage region to maintain the storage region in a predetermined temperature range during use of the container. See, e.g. FIG. 5.

In some embodiments, the vapor control unit is positioned within the evaporative region of the container and operably attached to the evaporative section of the vapor conduit. In some embodiments, the vapor control unit is operably attached to the central vapor conduit connector section. Some embodiments also include a valve control and a shutoff valve positioned for accessibility to a user, for example operably connected to the central vapor conduit connector section. Some embodiments include a central vapor conduit connector section including: a valve of a size, shape and position to reversibly inhibit flow of gas through the vapor conduit; and a controller operably attached to the valve. Some embodiments include a central vapor conduit connector section including: a valve of a size, shape and position to reversibly inhibit flow of gas through the vapor conduit; and a binary switch operably attached to the valve, the switch positioned to cause the valve to fully open and fully close in response to an external action on the switch.

In some embodiments, a set of portable container sections for assembly includes a lid of a size and shape to reversibly mate with an edge of the portable container adjacent to the access aperture. The lid can include insulation sufficient to maintain the storage region of the container within the predetermined temperature range during use in combination with the insulation within the insulation section. In some embodiments, a portable container includes a display, which can be affixed to an outer facing surface of a lid.

In some embodiments, a set of portable container sections for assembly includes: a temperature sensor attached to the storage container; a heating element positioned adjacent to the storage container wall or the storage container bottom; and a controller connected to the temperature sensor, the vapor control unit, and the heating element. For example, the controller can be pre-set to send an activating signal to the heating element after receipt of data from the temperature sensor that indicates that the storage region of the storage container has dropped below the use range of the container. For example, a container may be stored in a place with an ambient temperature below the use case of the assembled portable container.

In some embodiments, a set of portable container sections for assembly includes an internal recharging system including: a temperature sensor affixed to the desiccant section; a heating element affixed to the desiccant section; and a controller connected to the temperature sensor and the heating element. In some embodiments, the controller is attached to the vapor control unit. In some embodiments, the controller is attached to a user interface. The controller can, for example, include circuitry configured to initiate and maintain a preset recharging sequence in response to a signal received from the user interface. The controller can, for example, include circuitry configured to initiate a signal to the user interface in response to a signal received from the heating element (e.g. a "Caution: Hot" warning).

A method of assembly of a set of portable container sections, such as those described above, includes: positioning a storage container including an integral controlled evaporative cooling system and an evaporative section of a vapor conduit with an aperture external to the storage container within a desiccant section including an internal insulation unit and an outer desiccant region and a desiccant section of a vapor conduit with an aperture external to the desiccant section so that an exterior surface of the storage container is positioned within the insulation unit and the aperture of the evaporative section of the vapor conduit and the aperture of the desiccant section of the vapor conduit are aligned with each other; positioning a central vapor conduit section with a first end and a second end adjacent to the evaporative section and the desiccant section so that the first end of the central vapor conduit connects to the aperture of the evaporative section of the vapor conduit and the second end of the central vapor conduit connects to the aperture of the desiccant section of the vapor conduit; sealing the first end of the central vapor conduit to the aperture of the evaporative section of the vapor conduit with a gas-impermeable seal; sealing the second end of the central vapor conduit to the aperture of the desiccant section of the vapor conduit with a gas-impermeable seal; and substantially evacuating a continuous vapor-sealed interior region within the storage container, the desiccant section and the connected vapor conduit sections.

For example, FIG. 4 illustrates a set of portable container sections in cross-section being fitted into place. In the embodiment illustrated, the storage container 400 is being fit, as illustrated by the double arrows, into the desiccant fit section 410. The outer surface of the storage container 400 is in contact with the interior surface 415 of the inner wall of the desiccant section 410. The top edge 132 of the walls adjacent to the insulation region 130 are above the top edge of the storage container 400 and the top of the aperture 105 in the storage container 400. A central vapor conduit connector section 420 is being positioned over the top edge 132 of the walls of an insulation region 130 of a desiccant section 410. The respective ends of the central vapor conduit connector section 420 are being positioned adjacent to the exposed end of the evaporative section of the vapor conduit 423 and the desiccant section of the vapor conduit 427. Desiccant material is present in the desiccant region 160. An evaporative liquid is present in the evaporative region 120. During assembly, the sections are fitted to each other and sealed as appropriate. Also during assembly, the interior of the continuous vapor-sealed interior region within the evaporative region of the storage container, the desiccant section and the connected vapor conduit sections is evacuated to the point where the partial gas pressure in the continuous vapor-sealed interior region is as needed for the specific evaporative liquid/desiccant combination as well as the use case of the container.

In some embodiments, the positioning of the storage container includes: positioning the storage container entirely within the desiccant section. In some embodiments, the positioning of the storage container includes: positioning the storage container so that a storage region of the storage container is at the center, with the storage container surrounding the storage region, the insulation unit surrounding the storage container, and the desiccant region surrounding an exterior of the storage container.

In some embodiments, positioning the central vapor conduit section includes: positioning the central vapor conduit section to traverse an exterior top surface of the storage container and the desiccant section. In some embodiments, substantially evacuating a continuous vapor-sealed interior region within the storage container, the desiccant section and the connected vapor conduit sections includes: evacuating the internal space to a gas pressure below $10^{-3}$ Torr. As discussed further herein, the evaporative cooling system operates most effectively when the internal gas pressure of the interior space of the cooling system is below ambient gas pressure to an amount dependent on the specific embodiment, including the desiccant and evaporative liquid used.

In some embodiments, the method also includes: adding an evaporative liquid to the integrated evaporative cooler prior to sealing the first end of the central vapor conduit to the aperture of the evaporative section of the vapor conduit. In some embodiments, the method also includes: adding a desiccant to the outer desiccant region prior to sealing the second end of the central vapor conduit to the aperture of the desiccant section of the vapor conduit. For example, an evaporative liquid and desiccant selected to work together for a specific use case can be placed in their respective regions of the storage container prior to reducing the gas pressure within the continuous vapor-sealed interior region.

Figure 5:
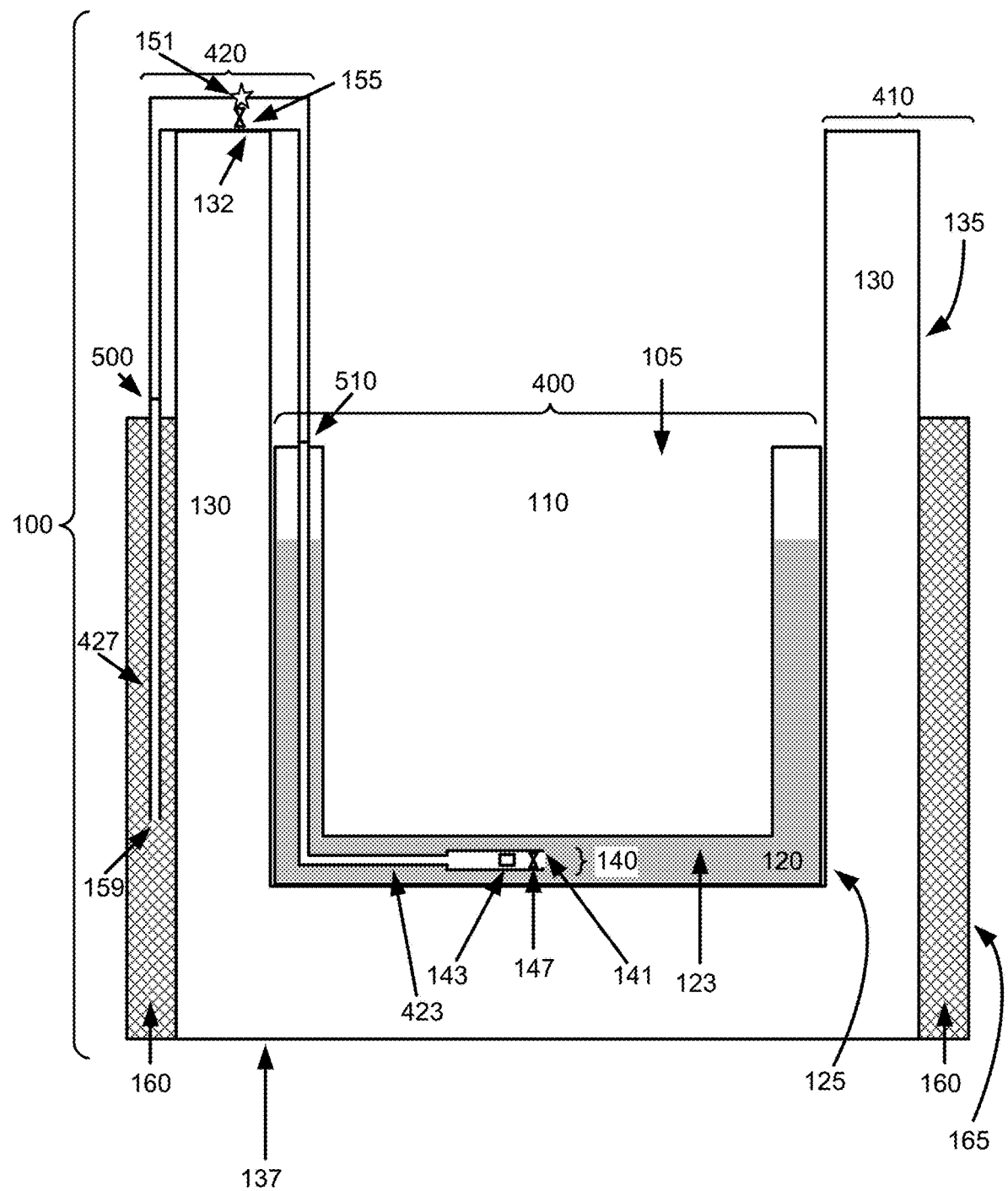
FIG. 5 is a schematic of a portable container including an integral controlled evaporative cooling system, shown in cross-section.

FIG. 5 illustrates a set of portable container sections in cross-section such as shown in FIG. 4, wherein the set of portable container sections has been positioned as required to fit together and seal together for use. A gas-impermeable and vapor-impermeable seal 510 is positioned at the junction between the first end of the central vapor conduit 420 to the aperture of the evaporative section 423 of the vapor conduit. A gas-impermeable and vapor-impermeable seal 500 is positioned at the junction between the second end of the central vapor conduit 420 to the aperture of the desiccant section 427 of the vapor conduit. The interior of the desiccant section 160, the interior of the desiccant section 427 of the vapor conduit, the interior of the central vapor conduit 420, the interior of the evaporative section 423 of the vapor conduit, the interior of the vapor control unit 140 and the interior of the evaporative section 120 form a contiguous internal space within the storage container. The contiguous internal space within the storage container is evacuated to a pressure appropriate to the use case, the desiccant used and the evaporative liquid used during the manufacturing process.

Figure 6:
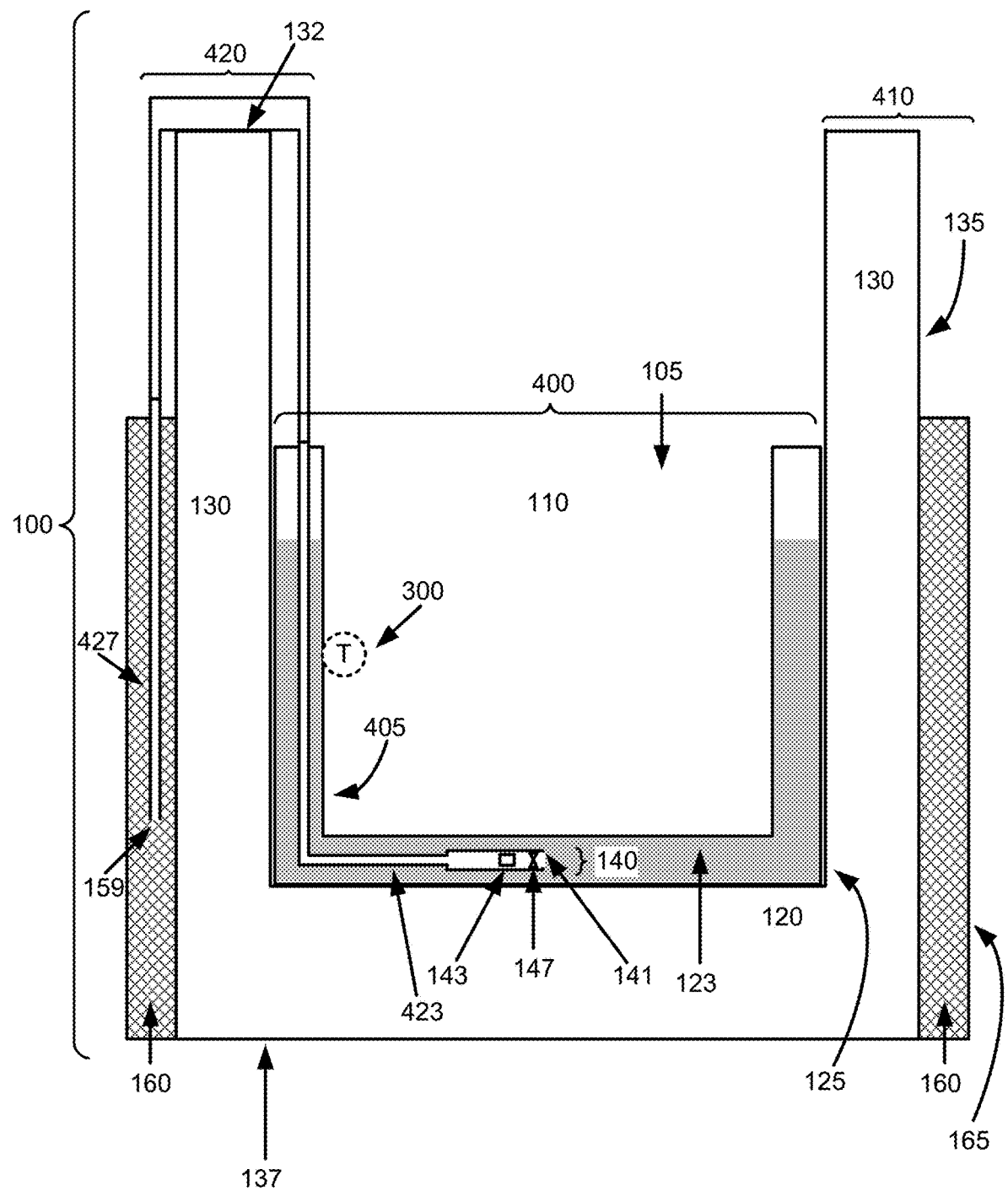
FIG. 6 is a schematic of a portable container including an integral controlled evaporative cooling system, shown in cross-section.

FIG. 6 illustrates an embodiment of a set of portable container sections in cross-section that have been assembled into a functional portable container including an integral controlled evaporative cooling system as described above. In the embodiment illustrated in FIG. 6, the portable container including an integral controlled evaporative cooling system includes a temperature sensor 300 affixed to the side wall of the inner container 405. In some embodiments, a sensor is positioned adjacent to the inner face of the storage region, as shown in FIG. 6. In some embodiments, a sensor is affixed to the face of the inner container, within the evaporative region. The sensor is operably attached to the controller within the vapor control unit. For example, in some embodiments a sensor is operably connected to the controller with a wire connection. For example, in some embodiments a sensor is operably connected to the controller with a wireless connection.

FIG. 7 illustrates aspects of a method of assembly of a set of portable container sections. Block 700 shows the method of assembly of a set of portable container sections. Block 710 depicts positioning a storage container including an integral controlled evaporative cooling system and an evaporative section of a vapor conduit with an aperture external to the storage container within a desiccant section including an internal insulation unit and an outer desiccant region and a desiccant section of a vapor conduit with an aperture external to the desiccant section so that an exterior surface of the storage container is positioned within the insulation unit and the aperture of the evaporative section of the vapor conduit and the aperture of the desiccant section of the vapor conduit are aligned with each other. Block 720 illustrates positioning a central vapor conduit section with a first end and a second end adjacent to the evaporative section and the desiccant section so that the first end of the central vapor conduit connects to the aperture of the evaporative section of the vapor conduit and the second end of the central vapor conduit connects to the aperture of the desiccant section of the vapor conduit. Block 730 shows sealing the first end of the central vapor conduit to the aperture of the evaporative section of the vapor conduit with a gas-impermeable seal. Block 740 depicts sealing the second end of the central vapor conduit to the aperture of the desiccant section of the vapor conduit with a gas-impermeable seal. Block 750 shows substantially evacuating a continuous vapor-sealed interior region within the storage container, the desiccant section and the connected vapor conduit sections.

In some embodiments, a portable container including an integral controlled evaporative cooling system includes: an insulated storage compartment including at least one wall forming sides and a bottom of an interior of a storage container with an access aperture, at least one wall forming sides and a bottom of an exterior of the storage container, wherein the exterior is positioned adjacent to the interior and there is a gap between the exterior and the interior, a seal between the at least one wall forming the sides and the bottom of the interior and the at least one wall forming the sides and the bottom of the exterior, the seal forming a gas-impermeable gap between the walls; and a lid of a size and shape to match the insulated storage compartment, including at least one wall forming sides and a bottom of the lid, the sides and bottom of a size and shape to reversibly mate with the interior of the storage container at a position adjacent to the access aperture, at least one wall forming a top of the lid, the top of the lid affixed to the sides of the lid, an evaporative compartment positioned within the lid at a position adjacent to the bottom of the lid, the evaporative compartment including an internal evaporative region, the evaporative compartment including an aperture at a position distal to the bottom of the lid, a desiccant compartment within the lid at a position adjacent to the top of the lid, the desiccant compartment including an internal desiccant region, the desiccant compartment including an aperture at a position distal to the top of the lid, and a vapor conduit affixed at a first end to the aperture in the evaporative compartment and affixed at a second end to the aperture in the desiccant compartment, the combination of the vapor conduit, the evaporative region and the desiccant region with the vapor conduit forming a gas-sealed and liquid-sealed region within the lid.

Figure 8:
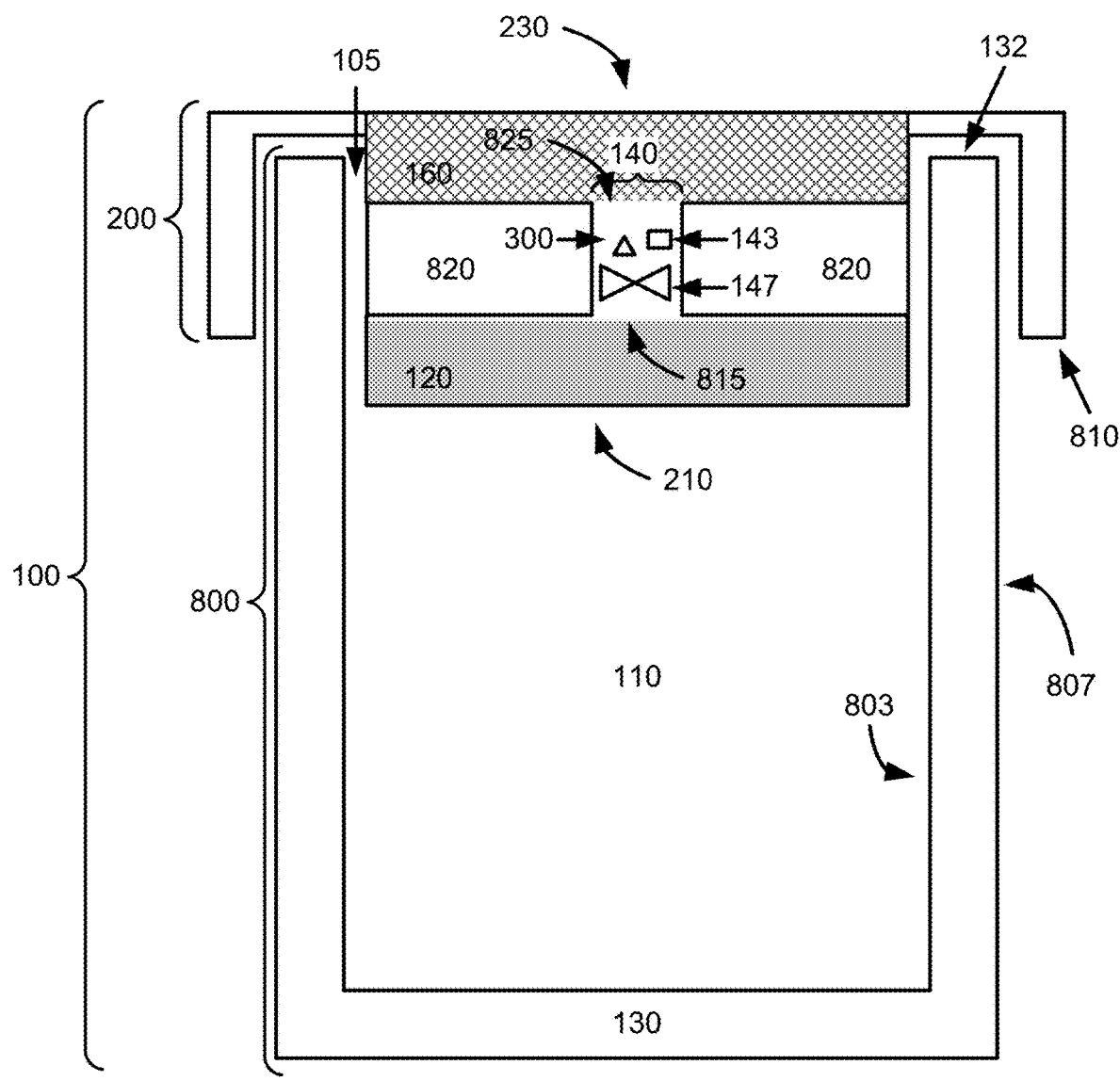
FIG. 8 is a schematic of a portable container including an integral controlled evaporative cooling system, shown in cross-section.

FIG. 8 illustrates aspects of a portable container including an integral controlled evaporative cooling system. The portable container shown in FIG. 8 is depicted in cross-section to illustrate internal features. The portable container 100 includes an insulated storage compartment 800, wherein the insulated storage compartment 800 includes wall 803 forming the sides and bottom of an interior 110 of a storage container with an access aperture 105. The interior 110 forms a storage region with insulation to minimize heat transfer to the exterior of the container and to maintain the internal temperature of the storage region within a predetermined range. The insulated storage compartment 800 also includes a wall 807 forming the sides and bottom of an exterior of the storage container 800. The exterior wall 807 of the storage container 800 is positioned adjacent to the interior wall 803 in a substantially parallel orientation. There is a gap between the exterior wall 807 and the interior wall 803. A top edge 132 seals at a first edge to the interior wall 803 and at a second edge to the exterior wall 807. There is a gas-impermeable seal between the one wall 803 forming the sides and the bottom of the interior and the wall 807 forming the sides and the bottom of the exterior, the seal forming a gas-impermeable gap between the walls. A gas-sealed insulation region 130 is included in the gap between the interior wall 803 and the exterior wall 807. The insulation region 130 has insulative properties sufficient to maintain the storage region 110 within a predetermined temperature range during an expected use case in conjunction with the lid 200.

In some embodiments, the insulated storage compartment includes a single access aperture positioned at the top of the storage compartment. For example, the insulated storage compartment 800 shown in FIG. 8 includes a single access aperture 105 positioned at the top of the storage compartment. In some embodiments, the insulated storage compartment includes an access aperture of a size and shape to permit a human hand to access an interior of the storage container. For example, an access aperture can be of a size and shape to permit a human hand to reach into the storage region and remove a medicinal container such as a vaccine vial. In some embodiments, the insulated storage compartment includes a cylindrical structure with an open top region forming the access aperture. For example, an insulated storage compartment can include an internal wall and an external wall which are both cylindrical and of corresponding proportions to form a cylindrical structure with an open top region forming an access aperture. In some embodiments, the insulated storage compartment includes a structure with rounded edges and an open top region forming the access aperture. For example, an insulated storage compartment can be fabricated as a rectangular structure with rounded edges. The rounded edges can, for example, improve portability of the container for a user. In some embodiments, the insulated storage compartment includes a structure of a size and shape to carry medicinals for a session of an outreach campaign. For example, an insulated storage compartment can include a storage region of a size and shape to carry sufficient medicinals, such as a 2 L storage volume, and sufficient insulative properties in the insulation region to maintain the storage region in a predetermined temperature range, such as 2-8 degrees C., for the expected length of the outreach, such as 48 hours, in an expected ambient temperature, such as 35-45 degrees C.

Some embodiments include a gas-impermeable gap between the walls of the insulated storage container including substantially evacuated space. Some embodiments include a gas-impermeable gap between the walls of the insulated storage container including space with a gas pressure below $10^{-3}$ Torr. Some embodiments include a gas-impermeable gap between the walls of the insulated storage container including space with a gas pressure below $10^{-5}$ Torr.

The embodiment illustrated in FIG. 8 also includes a lid 200 of a size and shape to match the insulated storage compartment 800. The lid 200 includes a wall 210 forming sides and a bottom of the lid 200, the sides and bottom of a size and shape to reversibly mate with the interior of the storage container at a position adjacent to the access aperture 105. In FIG. 8, space is shown between the wall 210 of the lid and the sides of the interior wall 803 for purposes of illustration, however ideally this space between the wall 210 and the interior wall 803 would be minimal to reduce heat leak. Some embodiments can include an insulation material in the space between the wall 210 and the interior wall 803, for example a gasket. The lid 200 also includes a wall 230 forming a top of the lid, the top of the lid affixed to the sides of the lid 200. The lid 200 includes an evaporative compartment 120 positioned within the lid 200. The evaporative compartment is oriented within the lid 200 at a position adjacent to the bottom of the lid 200, the evaporative compartment including an internal evaporative region 120, the evaporative compartment including an aperture 815 at a position distal to the bottom of the lid 200. The evaporative compartment is oriented within the lid 200 at a position adjacent to the storage region 110. In some embodiments, the lid includes an evaporative compartment including: an evaporative liquid; a wick structure for the evaporative liquid; and a gas pressure less than the ambient gas pressure.

As illustrated in the embodiment of FIG. 8, the lid 200 includes a desiccant compartment within the lid 200 at a position adjacent to the top of the lid 200, the desiccant compartment including an internal desiccant region 160. The desiccant compartment within the lid also includes an aperture 825 at a position distal to the top of the lid 200. In some embodiments, the desiccant compartment within the lid is positioned to maximize the radiation of heat generated by the exothermic reaction of desiccant material within the lid to a region adjacent to a top face of the lid. In some embodiments the lid includes a radiative structure, such as fins or a fan, positioned on the lid at a position external to the desiccant compartment within the lid. In some embodiments, the desiccant compartment including an internal desiccant region includes desiccant material.

The embodiment shown in FIG. 8 includes a vapor conduit affixed at a first end to the aperture 815 in the evaporative compartment and affixed at a second end to the aperture 825 in the desiccant compartment, the combination of the vapor conduit, the evaporative region 120 and the desiccant region 160 with the vapor conduit forming a gas-sealed and liquid-sealed region within the lid 200. In some embodiments, substantially evacuated space 820 is included in a gas-sealed region surrounding the vapor conduit. In some embodiments, the vapor conduit includes a vapor control unit 140. In some embodiments, the vapor conduit includes a valve 147 of a size, shape and position to reversibly inhibit flow of gas through the vapor conduit; and a controller 143 operably attached to the valve. In some embodiments, the vapor conduit includes a temperature sensor 300; a valve 147 of a size, shape and position to reversibly inhibit flow of gas through the vapor conduit in a continual manner; and a controller 143 operably attached to the valve.

In some embodiments, the lid also includes: a valve of a size, shape and position to reversibly inhibit flow of gas through the vapor conduit; and a binary switch operably attached to the valve, the switch positioned to cause the valve to fully open and fully close in response to an external action on the switch. For example, the valve can be a binary open/closed valve, and the switch can be positioned to reversibly cause the valve to open and close under the control of a user of the container. In some embodiments, the lid also includes a display unit. For example, a display unit can include information about the use of the container, the internal temperature, and/or the status of a valve within the vapor conduit. A display unit can be operably attached to the controller.

In some embodiments, a portable container including an integral controlled evaporative cooling system includes: a temperature sensor attached to the storage container; a heating element positioned adjacent to the storage container wall or the storage container bottom; and a controller connected to the temperature sensor, a vapor control unit attached to the vapor conduit, and the heating element. For example, the controller can be preset to send an activation or "turn on" signal to the heating element in response to receiving data from the temperature sensor at a temperature below a minimum temperature. For example, the controller can be preset to send a de-activation or "turn off" signal to the heating element in response to receiving data from the temperature sensor at a temperature above a minimum temperature.

In some embodiments, a portable container including an integral controlled evaporative cooling system further includes an internal recharging system including: a temperature sensor attached to the storage container; a heating element attached to the desiccant compartment within the lid; and a controller connected to the temperature sensor and the heating element. In some embodiments, the controller is connected to the vapor control unit. In some embodiments, the controller is connected to a user interface. The controller can include circuitry with predetermined control routines for recharging a specific portable container.

In some embodiments, a portable container including an integral controlled evaporative cooling system includes: at least one storage container wall configured to form a storage container with an access aperture; at least one insulation wall positioned adjacent to an exterior surface of the storage container wall, and affixed to the exterior surface to form a vapor-sealed insulation region external to a storage region; at least one desiccant region wall positioned adjacent to an exterior surface of the at least one insulation wall and sealed to the exterior surface of the at least one insulation wall to form a vapor-sealed desiccant region at least partially surrounding an exterior of the portable container; a lid for the portable container of a size and shape to reversibly mate with an interior surface of the at least one storage container wall, the lid including an internal vapor-sealed evaporative compartment, the lid including a bendable section positioned and configured to allow reversible access to the storage container; a vapor conduit with a first end positioned within the vapor-sealed evaporative region and a second end positioned within the vapor-sealed desiccant region, the vapor conduit including a bendable section aligned with the bendable section of the lid; and a vapor control unit attached to the vapor conduit.

Figure 9:
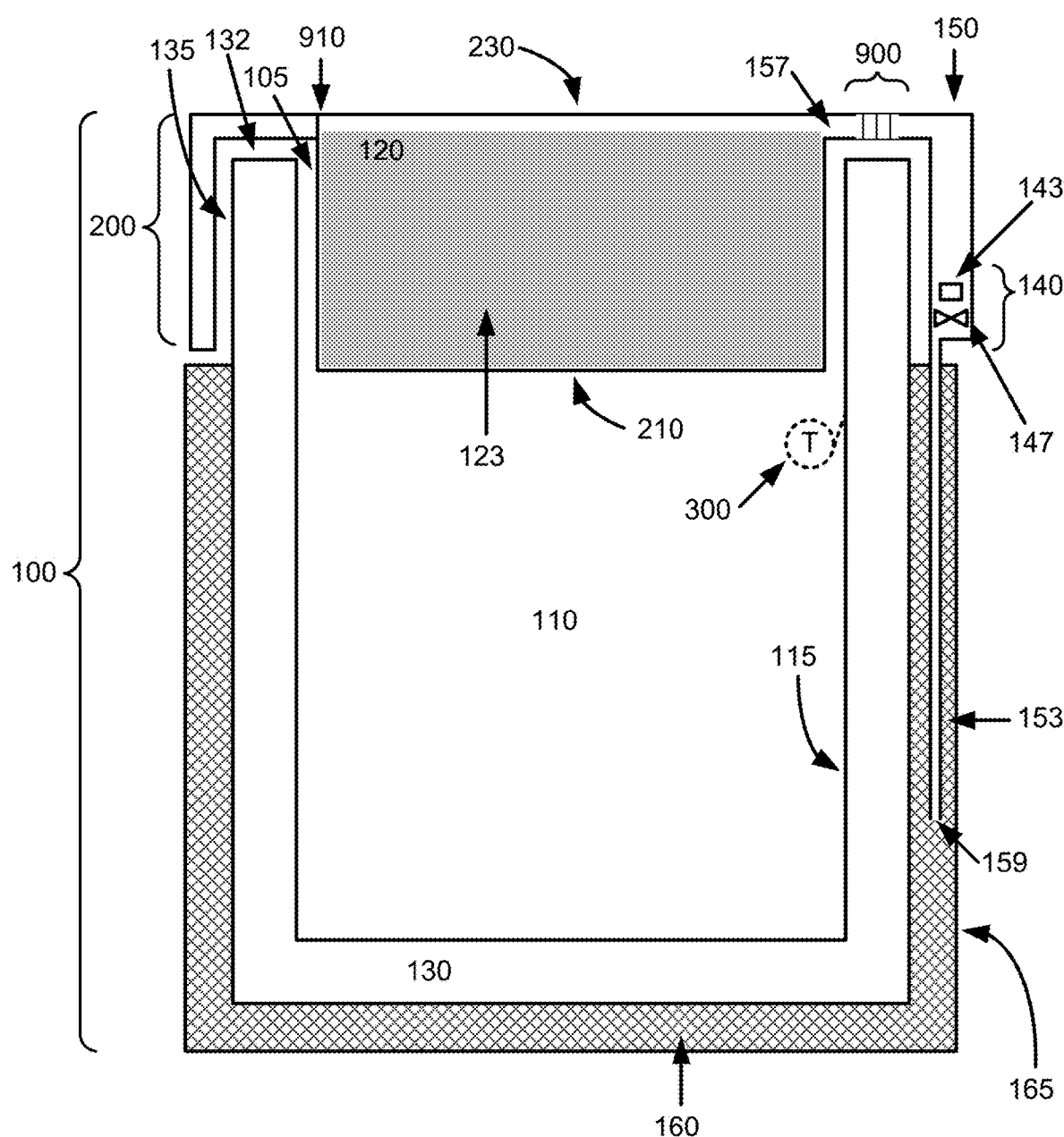
FIG. 9 is a schematic of a portable container including an integral controlled evaporative cooling system, shown in cross-section.

FIG. 9 illustrates aspects of a portable container 100 including an integral controlled evaporative cooling system. The embodiment illustrated in FIG. 9 is shown in cross-section to show internal features of the portable container. The portable container 100 includes a storage container wall 115 configured to form a storage container with an access aperture 105. The portable container 100 includes an insulation wall 135 positioned adjacent to an exterior surface of the storage container wall 115, and affixed to the exterior surface to form a vapor-sealed insulation region 130 external to a storage region 110. In some embodiments, the storage container includes a single access aperture 105 positioned at the top of the storage container. In some embodiments, the storage container includes an access aperture of a size and shape to permit a human hand to access an interior of the storage container. In some embodiments, the storage container includes a cylindrical structure with an open top region forming the access aperture 105. In some embodiments, the storage container includes a structure with rounded edges and an open top region forming the access aperture 105. In some embodiments, the storage container includes a structure of a size and shape to carry medicinals for a session of an outreach campaign. In some embodiments, the vapor-sealed insulation region includes substantially evacuated space. In some embodiments, the vapor-sealed insulation region includes space with a gas pressure below $10^{-1}$ Torr. In some embodiments, the vapor-sealed insulation region includes space with a gas pressure below $10^{-3}$ Torr. In some embodiments, the vapor-sealed insulation region includes space with a gas pressure below $10^{-5}$ Torr.

The embodiment illustrated in FIG. 9 includes a desiccant region wall 165 positioned adjacent to an exterior surface of the insulation wall 135 and sealed to the exterior surface of the insulation wall 135 to form a vapor-sealed desiccant region 160 at least partially surrounding an exterior of the portable container 100. In some embodiments, the desiccant region wall forms a vapor-sealed desiccant region that encircles the external vertical sides of the portable container. In some embodiments, the desiccant region wall forms a vapor-sealed desiccant region that surrounds the exterior of the portable container.

FIG. 9 shows an embodiment including a lid 200 for the portable container 100 of a size and shape to reversibly mate with an interior surface of the storage container wall 115. The lid 200 includes an internal vapor-sealed evaporative compartment 120. The lid includes a bendable section 900 positioned and configured to allow reversible access to the storage region 110 of the portable container 100. In some embodiments, the internal vapor-sealed evaporative compartment of the lid is positioned adjacent to the storage region of the container when the lid is in a closed position. For example, the evaporative compartment of the lid can be positioned to permit maximal evaporative cooling of the storage region within the portable container. For example, the evaporative compartment of the lid can be positioned so that a lower face of the lid adjacent to the evaporative compartment of the lid is adjacent to the storage region of the portable container. In the embodiment shown in FIG. 9, the bottom 210 surface of the lid 200 is positioned adjacent to the storage region 110 within the container 100.

In some embodiments, the internal vapor-sealed evaporative compartment of the lid includes: an evaporative liquid; a wick structure for the evaporative liquid; and a gas pressure less than the ambient gas pressure. In the embodiment shown in FIG. 9, the evaporative compartment 120 within the lid 200 includes an evaporative liquid 120 as well as space above the top of the evaporative liquid 120. The evaporative liquid can be dispersed within a wick structure within the evaporative compartment, thereby increasing contact of the evaporative liquid with the storage container wall.

As shown in FIG. 9, some embodiments of a portable container 100 include a vapor conduit 150 with a first end 157 positioned within the vapor-sealed evaporative region 120 and a second end 153 positioned within the vapor-sealed desiccant region 160. The vapor conduit 150 includes a bendable section 900 aligned with the bendable section 900 of the lid 200. A vapor control unit 140 is attached to the vapor conduit 150. In some embodiments, the vapor conduit includes a gas pressure less than the ambient gas pressure external to the portable container. In some embodiments, the vapor control unit 140 includes a valve 147 of a size, shape and position to reversibly inhibit flow of gas through the vapor conduit 150, and a controller 143 operably attached to the valve 147. In some embodiments, the vapor control unit 140 includes: a temperature sensor 300 attached to the storage container 100; a valve 147 of a size, shape and position to reversibly inhibit flow of gas through the vapor conduit 150 in a continual manner; and a controller 143 operably attached to the valve 147. Some embodiments include: a valve of a size, shape and position to reversibly inhibit flow of gas through the vapor conduit; and a binary switch operably attached to the valve, the switch positioned to cause the valve to fully open and fully close in response to an external action on the switch. In some embodiments, a display unit is attached to the lid.

The evaporative cooling system within the portable container can be recharged, repaired or refreshed to allow reuse of the portable container with its integrated controlled evaporative cooling system multiple times. For example, in some embodiments a portable container includes an evaporative cooling system that is fabricated with a goal of recharging the integrated controlled evaporative cooling system at least 100 times (e.g. cycles). For example, in some embodiments a portable container includes an integrated controlled evaporative cooling system that is fabricated with a goal of recharging the evaporative cooling system at least 150 times (e.g. cycles). For example, in some embodiments a portable container includes an integrated controlled evaporative cooling system that is fabricated with a goal of recharging the evaporative cooling system at least 200 times (e.g. cycles). In some embodiments, a portable container includes an integrated controlled evaporative cooling system that is designed to be used for at least one day per average month and to be rechargeable for at least 5 years. In some embodiments, a portable container includes an integrated controlled evaporative cooling system that is designed to be used for at least one day per average month and to be rechargeable for at least 10 years.

Over time, part of the mass of evaporative liquid initially present in the evaporative region will be transferred to the interior of the desiccant region as vapor moving through the vapor conduit. The portable container will periodically, therefore, require a recharging of the evaporative liquid from the desiccant region through the vapor conduit in order to maintain the functionality of the container. Since the interior of the evaporative region, the vapor conduit, and the desiccant region are a gas-sealed and liquid-sealed continuous region, the evaporative liquid can be returned to the evaporative region, as vapor, to recharge the system. Some embodiments include an integrated, internal recharging system. Some embodiments rely on external heat, such as from an external recharging device, to recharge the portable container.

It is expected that the recharge system can operate many times over the lifetime use of the portable container without replacement of the desiccant or evaporative liquid. For example, assuming that a portable container will have monthly recharging and be in operational use for 10 years, a container will include a desiccant and evaporative liquid in a configuration of the container that is expected to be rechargeable for reuse at least 120 times (12 times per year for 10 years). For example, assuming that a portable container will have bi-weekly recharging and be in operational use for 5 years, a container will include a desiccant and evaporative liquid in a configuration of the container that is expected to be rechargeable for reuse at least 130 times (26 times per year for 5 years). In some embodiments, a portable container is configured for recharging at least 200 times over the multi-year use of the container without replacement of the desiccant or evaporative liquid.

In some embodiments, a recharging device for a portable container including an integral controlled evaporative cooling system includes: a frame of a size and shape to secure a portable container including an integral controlled evaporative cooling system; at least one heating unit positioned adjacent to the exterior of the portable container including an integral controlled evaporative cooling system; at least one fan affixed to the frame, the fan oriented to direct air against an internal surface of the portable container including an integral controlled evaporative cooling system; and a controller operably connected to the at least one heating unit and the at least one fan, the controller capable of sending control signals to both the least one heating unit and the at least one fan.

In some embodiments, a recharging device is integral to the portable container including an integral controlled evaporative cooling system. For example, in some embodiments a recharging device includes: a heating element positioned within the interior of the desiccant region, the heating element positioned to supply thermal energy to the interior of the desiccant region; and a controller connected to the heating element. For example, a heating element positioned within the interior of the desiccant region can be an electrical heating element. For example, in some embodiments a recharging device includes: a heating element affixed to the exterior surface of a wall of the desiccant region of a portable container; and a controller connected to the heating element. For example, a heating element affixed to the exterior surface of a wall of the desiccant region can be an electrical heating element embedded within a thin film coating affixed to the exterior of the wall, such as a ceramic thin film enclosing an electric heating element.

The controller of the recharging device activates the recharge cycle for the system based on factors predetermined for a particular embodiment, including the ambient temperature, the temperature of the evaporative liquid currently present in the evaporative region, and input from a user. During recharge, the controller of the recharging device initiates heating of at least one heating unit. The heating unit is activated to a predetermined temperature for a preset period of time. The time and temperature settings for the heating unit depend on the embodiment, for example the type of desiccant and evaporative liquid present in the container, and the size and shape of the desiccant region, the vapor conduit and the evaporative region of the container. For example, in some embodiments, a heating unit is held at 300 degrees Centigrade for at least 30 minutes during the recharge cycle. For example, in some embodiments, a heating unit is held at 250 degrees Centigrade for at least 60 minutes during the recharge cycle. For example, in some embodiments, a heating unit is held in the temperature range between 250 and 300 degrees Centigrade for a predetermined period of time during the recharge cycle. During the time when the heating unit is hot, the evaporative liquid associated with the desiccant within the desiccant region converts into vapor. The vapor moves through the vapor conduit and condenses within the relatively cool interior evaporative region of the container. After the heating unit is turned off, the desiccant region can cool down, for example through radiant cooling, and the recharge cycle is completed. In some embodiments, the desiccant wall includes a one-way blow valve configured to open in case the gas pressure within the desiccant region exceeds a threshold level.

Figure 10:
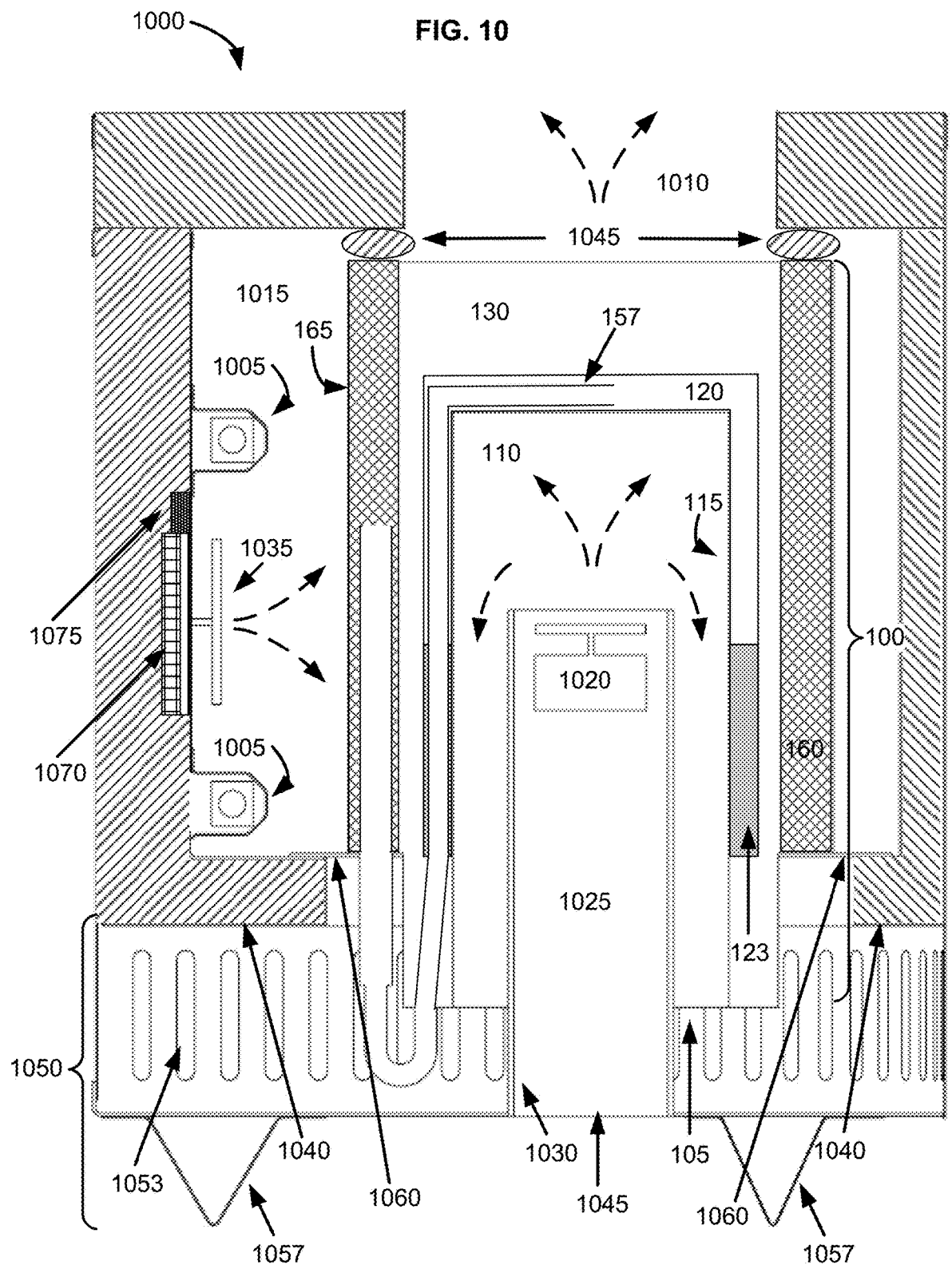
FIG. 10 is a schematic of a recharging device for a portable container including an integral controlled evaporative cooling system, shown in cross-section.

FIG. 10 illustrates aspects of a recharging device for a portable container including an integral controlled evaporative cooling system shown in cross-section to depict internal features of the device. The recharging device 1000 includes a frame 1060 that in the illustration has secured a portable container 100 including an integral controlled evaporative cooling system in position within the recharging device. The portable container 100 is held in an inverted position from its usual use position. For example, the access aperture 105 is positioned at the lower face of the portable container 100, and the first end 157 of the vapor conduit is positioned above the central storage region 110. The evaporative region 120 is separated from the central storage region 110 by a wall 115. The evaporative liquid 123 positioned within the evaporative region 120 has reduced in volume during use of the integral controlled evaporative cooling system of the portable container 100, so that the interior of the evaporative region 120 includes a substantial volume of empty space with reduced gas pressure relative to the ambient conditions adjacent to the exterior of the device. The interior of the evaporative region 120 includes less evaporative liquid 123 than when the integral controlled evaporative cooling system of the portable container 100 is fully "charged," or configured to operate for a maximum time (see, e.g. FIGS. 1, 3 and 4-6). The evaporative liquid 123 remaining within the evaporative region 120 has fallen to the lower portion of the evaporative region 120. The portable container 100 includes an insulation region 130 surrounding the evaporative region 120. A desiccant region 160 is positioned along the outer face of the sides of the portable container 100, so that the outer wall 165 of the desiccant region 160 forms the outer wall of the portable container 100.

In some embodiments, a recharging device includes: at least one insulated wall positioned exterior to the at least one heating unit; at least one aperture at a top end of the recharging unit, the at least one aperture positioned to permit air flow to a bottom region of the secured portable container; and at least one aperture at a bottom end of the recharging unit, the at least one aperture positioned to permit air flow to a top region of the secured portable container. The recharging device 1000 for a portable container 100 including an integral controlled evaporative cooling system shown in FIG. 10 includes insulation 1040 surrounding the frame 1060. An aperture 1010 is positioned within the upper face of the recharging device 1000, the aperture 1010 positioned adjacent to a surface of the insulation region 130 of the portable container 100. The aperture is positioned to permit air flow, depicted in FIG. 10 as the dotted arrows, around the surface of the portable container 100. Some embodiments include at least one sealing gasket positioned between a surface of the frame and a surface of a secured portable container. In the embodiment shown in FIG. 10, sealing gaskets 1045 minimize air flow around the sides of the recharging device 1000 through the aperture 1010.

The recharging device 1000 includes heating units 1005 positioned adjacent to the exterior of the portable container 100. In the embodiment shown in FIG. 10, the heating units 1005 are positioned adjacent to the exterior wall 165 of the desiccant region 160 of the portable container 100. In some embodiments, the heating units are positioned directly adjacent to the exterior of the desiccant region, for example so that the heating units are in physical contact with the exterior surface of the portable container. In some embodiments, the heating units are positioned adjacent to the exterior of the desiccant region with a gap between the exterior of the heating units and the exterior of the portable container, the gap forming a cavity within the recharging device. For example, there can be a heating chamber formed in the cavity between the surface of the heating units, the surface of the portable container, and the interior of the recharging device. In the embodiment shown in FIG. 10, the heating units 1005 are separated from the exterior wall 165 of the portable container 100 by a gap 1015.

In some embodiments, a heating element includes: a radiative heating element; a cavity positioned between the heating element and a wall of a secured portable container; and a fan within the cavity, the fan positioned to move air to the wall of the secured portable container. For example, FIG. 10 depicts a recharging device 1000 with a radiative heating element 1005. The radiative heating element can include, for example, an electric heating element. A cavity 1015 is positioned between the heating element 1005 and the exterior wall 165 of the secured portable container 100. A fan 1035 is affixed to the frame 1060 of the recharging device, the fan 1035 positioned to move air (e.g. depicted by dotted arrows in FIG. 10) within the cavity 1015 to the wall 165 of the secured portable container 100. In some embodiments, a heating element includes an inductive heating element placed adjacent to a position where a surface of a portable container is predicted to be when the recharging unit is in use.

Some embodiments include a fan positioned to increase air flow within a storage region of a secured portable container. For example, the embodiment illustrated in FIG. 10 includes a fan 1020 attached to a wall 1030 forming a hollow tube secured to the frame 1060. The wall 1030 forms a hollow tube structure with an aperture 1045 at the outer edge of the recharging device 1000. The interior space 1025 of the hollow tube structure formed by the wall 1030 is sized, shaped and positioned to direct air flow (illustrated by dotted lines in FIG. 10) through the associated fan 1020 into the interior storage region 110 of the portable container 100 secured to the recharging device 1000.

The embodiment shown in FIG. 10 includes a controller 1070 operably connected to the heating unit 1005 as well as to the fan 1035. The controller is configured and attached to both the heating unit and the fan so that the controller is capable of sending control signals to both the heating unit and the fan. The controller can be attached to the fan and to the heating unit with a wire connector. The controller can be attached to the fan and to the heating unit with a wireless connector. In some embodiments, the controller includes circuitry configured to turn the at least one heating unit and the at least one fan on and off on a preset schedule.

Some embodiments of a recharging device include a temperature sensor positioned within the frame, the temperature sensor operably attached to the controller. For example, the embodiment illustrated in FIG. 10 includes a temperature sensor 1075 affixed to the frame 1060. The temperature sensor 1075 is positioned adjacent to the cavity 1015. The temperature sensor 1075 is directly connected to the controller 1070. In some embodiments, the controller includes circuitry configured to turn the at least one heating unit and the at least one fan on and off in response to signals received from the temperature sensor. For example, the controller can include circuitry to turn the heating unit off after receipt of signals from the temperature sensor indicating a predetermined temperature is reached. The predetermined temperature can be set relative to a predetermined temperature of recharging a specific design of a portable container. For example, some embodiments of a portable container can be recharged with exposure of the wall exterior to the desiccant regions to a temperature in the range between 250 degrees C. and 300 degrees C.

Some embodiments of a recharging device include a display unit. For example, a recharging device can include an external indicator that the device is hot, to provide a caution warning to a user. For example, a recharging device can include a display unit that displays a red light when a temperature sensor of the recharging device is above a predetermined temperature (e.g. 100 degrees C.). For example, a recharging device can include a display unit that illustrates a text or numerical indicator, such as a temperature readout or a warning (e.g. "Caution, HOT"). Some embodiments of a recharging device include a user interface. For example, a recharging device can include an on-off switch. For example, a recharging device can include an interface configured to accept temperature and time ranges from a user to direct operation of the heating unit through the controller.

The embodiment illustrated in FIG. 10 also includes a stand 1050 attached to the frame 1060. The stand 1050 is positioned and oriented to enhance air flow around the bottom of the recharging device, including at the aperture 1045 of the interior space 1025 of the hollow tube structure formed by the wall 1030. The stand 1050 includes a series of air flow openings 1053 around the exterior of the stand 1050. The stand 1050 is elevated with feet 1057 which assist to stabilize the recharging device 1000 and also provide a space to permit air flow around the lower surface of the recharging device 1000.

Figure 11:
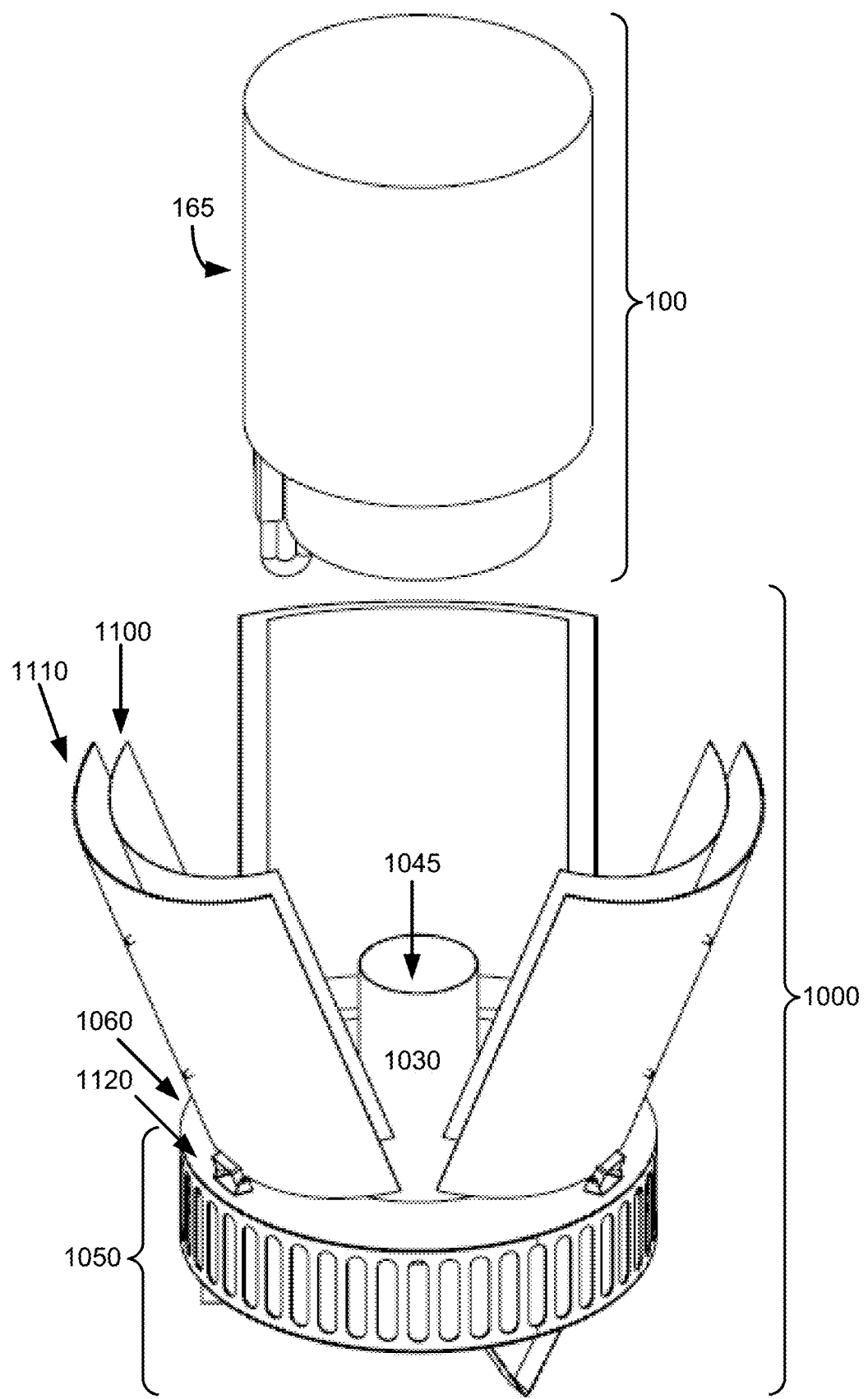
FIG. 11 is a schematic of a recharging device for a portable container including an integral controlled evaporative cooling system.

FIG. 11 illustrates an embodiment of a recharging device 1000. The embodiment illustrated includes three pairs of inner walls 1100 and outer walls 1110. The pairs of walls each span approximately a third of the circumference of the exterior of the recharging device. In the view of FIG. 11, the three pairs of inner walls 1100 and outer walls 1110 are each attached to the frame 1060 with hinges 1120 to permit the pairs of inner walls 1100 and outer walls 1110 to fold outwards. When the pairs of inner walls 1100 and outer walls 1110 are folded away from the center of the recharging device 1000 by action of the hinges 1120, the recharging device 1000 is opened sufficiently so that a portable container 100 can be positioned within the recharging device 1000. When the portable container 100 is placed against the frame 1060, the pairs of inner walls 1100 and outer walls 1110 are folded back to a position in parallel with the exterior wall 165 of the portable container 100, and the recharging device 1000 is in position for use.

Figure 12:
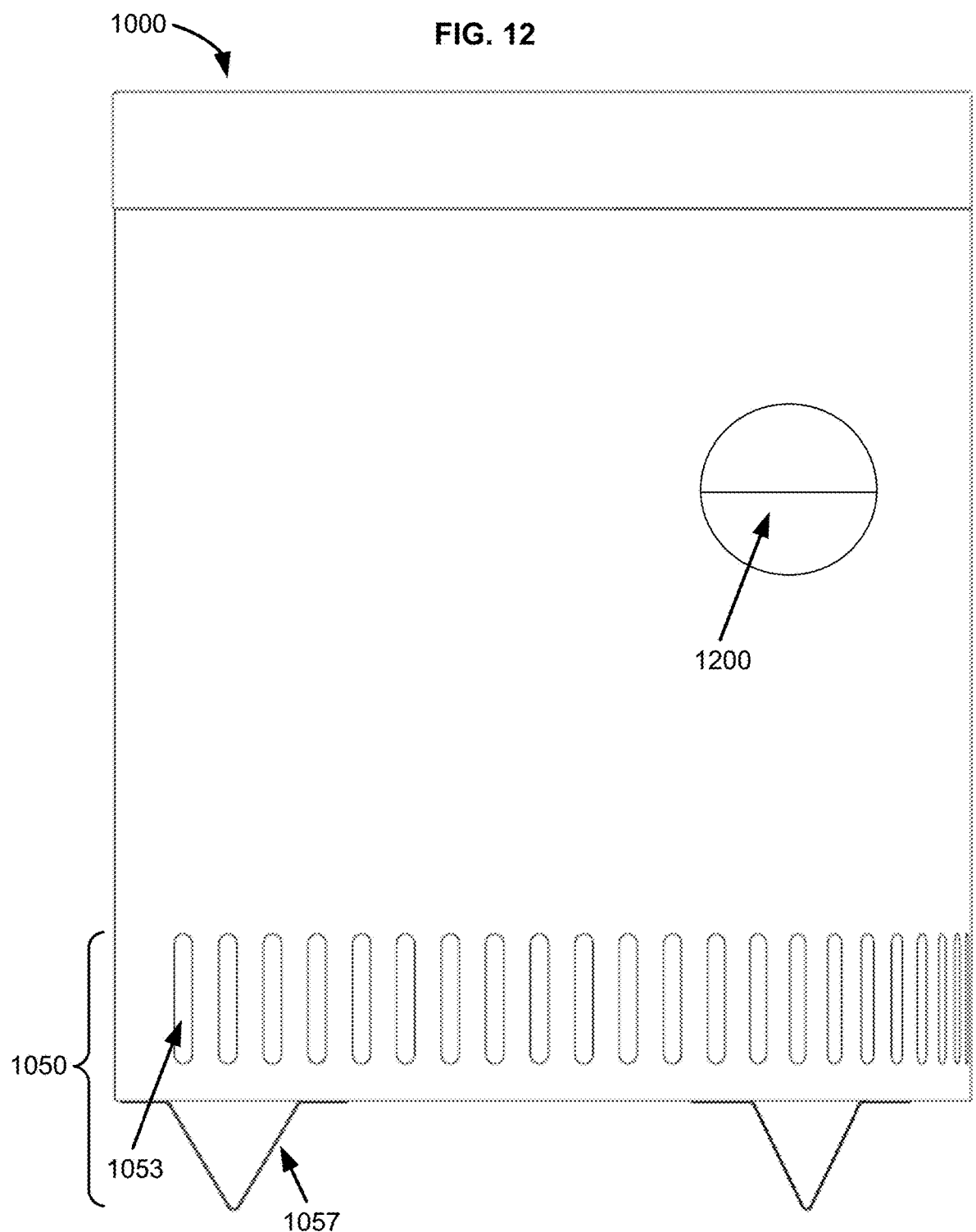
FIG. 12 is a schematic of a recharging device for a portable container including an integral controlled evaporative cooling system.

FIG. 12 depicts and external view of a recharging device 1000. The illustration depicts a side view of the recharging device 1000. The recharging device 1000 includes a stand 1050 including a plurality of apertures 1053. The stand includes feet 1057 to stabilize the recharging device 1000 and increase air flow around the bottom of the recharging device 1000. The recharging device 1000 also includes an exterior air vent 1200 covered by louvered doors. The exterior air vent 1200 can be positioned, for example, to be opened as needed to increase air flow into an interior cavity or region of the recharging device 1000, for example during the cooling process after a portable container has been heated.

Aspects of the subject matter described herein are set out in the following numbered clauses:

1. In some embodiments, a portable container including an integral controlled evaporative cooling system includes: a storage container wall sealed to a storage container bottom, the storage container wall and storage container bottom positioned to form a storage container with an access aperture; an evaporative region wall sealed to an evaporative region bottom, the evaporative region wall positioned adjacent to an exterior of the storage container wall and the evaporative region bottom positioned adjacent to an exterior of the storage container bottom, a top edge of the evaporative region wall sealed to the exterior of the storage container wall at a position below a top edge of the storage container wall to form a vapor-sealed evaporative region between the evaporative region wall and the evaporative region bottom and the storage container wall and the storage container bottom; an insulation wall positioned adjacent to an exterior surface of the evaporative region wall and the storage container wall, a top of the insulation wall sealed to the exterior surface of the storage container wall at a position above the evaporative region wall to form a vapor-sealed insulation region external to the storage container and to the evaporative region; a desiccant region wall positioned adjacent to an exterior surface of the insulation wall and sealed to the exterior surface of the insulation wall to form a vapor-sealed desiccant region, the desiccant region wall positioned to form an exterior surface of the portable container; a vapor conduit with a first end positioned within the vapor-sealed evaporative region and a second end positioned within the vapor-sealed desiccant region; and a vapor control unit attached to the vapor conduit.
2. The portable container including the integral controlled evaporative cooling system of paragraph 1, wherein the storage container wall is sealed to the storage container bottom with a gas-impermeable seal.
3. The portable container including the integral controlled evaporative cooling system of paragraph 1, wherein the storage container with the access aperture includes: a single access aperture at the top of the storage container.
4. The portable container including the integral controlled evaporative cooling system of paragraph 1, wherein the storage container with the access aperture includes: the access aperture of a size and shape to permit a human hand to access an interior of the storage container.
5. The portable container including the integral controlled evaporative cooling system of paragraph 1, wherein the storage container with the access aperture is cylindrical with an open top region forming the access aperture.
6. The portable container including the integral controlled evaporative cooling system of paragraph 1, wherein the storage container with the access aperture includes rounded edges with an open top region forming the access aperture.
7. The portable container including the integral controlled evaporative cooling system of paragraph 1, wherein the storage container with an integrated controlled evaporative cooler includes internal structures in a radial configuration.
8. The portable container including the integral controlled evaporative cooling system of paragraph 1, wherein the evaporative region wall is sealed to the evaporative region bottom with a gas-impermeable seal.
9. The portable container including the integral controlled evaporative cooling system of paragraph 1, wherein the evaporative region wall is sealed to the exterior of the storage container wall with a gas-impermeable seal.
10. The portable container including the integral controlled evaporative cooling system of paragraph 1, wherein the evaporative region wall and the evaporative region bottom are of a size, shape and position to form a gap between a surface of the evaporative region wall and the evaporative region bottom with the storage container wall and the storage container bottom.
11. The portable container including the integral controlled evaporative cooling system of paragraph 1, wherein the vapor-sealed evaporative region includes: an evaporative liquid; a wick structure for the evaporative liquid; and a gas pressure less than the ambient gas pressure.
12. The portable container including the integral controlled evaporative cooling system of paragraph 1, wherein the evaporative region wall is formed as a cylindrical structure.
13. The portable container including the integral controlled evaporative cooling system of paragraph 1, wherein the evaporative region wall is formed as a structure with rounded edges.
14. The portable container including the integral controlled evaporative cooling system of paragraph 1, wherein the insulation wall is sealed to an insulation bottom, and the insulation bottom is positioned adjacent to an exterior of the evaporative region bottom.
15. The portable container including the integral controlled evaporative cooling system of paragraph 1, wherein a bottom of the insulation wall is sealed to the exterior surface of the evaporative region wall at a position adjacent to the evaporative region bottom.
16. The portable container including the integral controlled evaporative cooling system of paragraph 1, wherein the vapor-sealed insulation region includes substantially evacuated space.
17. The portable container including the integral controlled evaporative cooling system of paragraph 1, wherein the vapor-sealed insulation region includes space with a gas pressure below $10^{-1}$ Torr.

18. The portable container including the integral controlled evaporative cooling system of paragraph 1, wherein the vapor-sealed insulation region includes space with a gas pressure below $10^{-3}$ Torr.
19. The portable container including the integral controlled evaporative cooling system of paragraph 1, wherein the vapor-sealed insulation region includes space with a gas pressure below $10^{-5}$ Torr.
20. The portable container including the integral controlled evaporative cooling system of paragraph 1, wherein the desiccant region wall encircles the exterior surface of the insulation wall.
21. The portable container including the integral controlled evaporative cooling system of paragraph 1, wherein the desiccant region wall is sealed to a desiccant region bottom, and the desiccant region bottom is positioned adjacent to an exterior of an insulation bottom to form a desiccant region adjacent to the insulation wall and insulation bottom.
22. The portable container including the integral controlled evaporative cooling system of paragraph 1, wherein the vapor-sealed desiccant region includes desiccant material.
23. The portable container including the integral controlled evaporative cooling system of paragraph 1, wherein the vapor conduit includes a hollow structure.
24. The portable container including the integral controlled evaporative cooling system of paragraph 1, wherein the vapor conduit includes a tubular structure.
25. The portable container including the integral controlled evaporative cooling system of paragraph 1, wherein the vapor control unit includes: a valve of a size, shape and position to reversibly inhibit flow of gas through the vapor conduit; and a controller operably attached to the valve.
26. The portable container including the integral controlled evaporative cooling system of paragraph 1, including: a temperature sensor attached to the storage container; a valve of a size, shape and position to reversibly inhibit flow of gas through the vapor conduit in a continual manner; and a controller operably attached to the valve.
27. The portable container including the integral controlled evaporative cooling system of paragraph 1, wherein the desiccant region, the evaporative region and the vapor conduit are sealed together with a continuous vapor-sealed interior region.
28. The portable container including the integral controlled evaporative cooling system of paragraph 27, wherein the continuous vapor-sealed interior region includes a gas pressure less than the ambient gas pressure adjacent to an exterior of the portable container.
29. The portable container including the integral controlled evaporative cooling system of paragraph 1, further including: a lid of a size and shape to reversibly mate with an edge of the portable container adjacent to the access aperture.
30. The portable container including the integral controlled evaporative cooling system of paragraph 1, further including: a shutoff valve of a size, shape and position to reversibly fully inhibit flow of gas through the vapor conduit; and a switch operably attached to the valve, the switch positioned to cause the valve to fully open and fully close in response to an external action on the switch.
31. The portable container including the integral controlled evaporative cooling system of paragraph 1, further including: a temperature sensor attached to the storage container; a heating element positioned adjacent to the storage container wall or the storage container bottom; and a controller connected to the temperature sensor, the vapor control unit, and the heating element.
32. The portable container including the integral controlled evaporative cooling system of paragraph 1, further including: a temperature sensor affixed to the portable container; a heating element positioned within or adjacent to the vapor-sealed desiccant region; and a controller connected to the temperature sensor and the heating element.
33. In some embodiments, a set of portable container sections for assembly includes: a storage container with an integrated controlled evaporative cooler, including an interior storage container positioned with an access aperture at an upper region of the interior storage container, an outer storage container positioned with an access aperture at an upper region of the interior storage container, the outer storage container sealed to the interior storage container at a position adjacent to the access aperture to form an vapor-sealed evaporative region between the interior storage container and the outer storage container, and an evaporative section of a vapor conduit, the evaporative section including a first end positioned within the vapor-sealed evaporative region and a second end positioned at an upper region of the storage container with an aperture external to the storage container; a desiccant section including an insulation unit with an interior surface of a size and shape to mate with an exterior surface of the storage container, and of a size and shape to extend beyond the access aperture of the storage container, a desiccant region wall encircling the insulation unit, the desiccant region wall sealed to an exterior of the insulation unit with a vapor-impermeable seal to form a desiccant region exterior to the insulation unit, and a desiccant section of a vapor conduit, the desiccant section including a first end positioned within the desiccant region and a second end positioned at an upper region of the desiccant region with an aperture external to the desiccant region; and a central vapor conduit section, including a first end of a size and shape to mate and seal with the second end of the evaporative section of the vapor conduit, a second end of a size and shape to mate and seal with the second end of the desiccant section of the vapor conduit, and a connector section of the central vapor conduit positioned between the first end of the central vapor conduit and the second end of the central vapor conduit, the connector section of a size and shape to position the first end to mate and seal with the second end of the evaporative section and position the second end to mate and seal with the second end of the desiccant section; wherein the vapor conduit includes an attached vapor control unit and wherein the evaporative section, the desiccant section and the central vapor conduit section are each of a size and shape to fit together into a continuous vapor-sealed interior region of an integrated portable container including a controlled integral controlled evaporative cooling system.
34. The set of portable container sections for assembly of paragraph 33, wherein the storage container with an integrated controlled evaporative cooler includes a gas-impermeable seal between the inner storage container and the outer storage container.
35. The set of portable container sections for assembly of paragraph 33, wherein the storage container with an integrated controlled evaporative cooler includes a gas-impermeable seal between the second end of the evaporative section of the vapor conduit and the storage container.
36. The set of portable container sections for assembly of paragraph 33, wherein the storage container with an integrated controlled evaporative cooler includes a single access aperture at the top of the storage container.

37. The set of portable container sections for assembly of paragraph 33, wherein the storage container with an integrated controlled evaporative cooler includes an access aperture of a size and shape to permit a human hand to access an interior of the storage container.

38. The set of portable container sections for assembly of paragraph 33, wherein the storage container with an integrated controlled evaporative cooler is cylindrical with an open top region forming an access aperture.

39. The set of portable container sections for assembly of paragraph 33, wherein the storage container with an integrated controlled evaporative cooler includes a cylindrical structure.

40. The set of portable container sections for assembly of paragraph 33, wherein the storage container with an integrated controlled evaporative cooler includes a structure with rounded edges.

41. The set of portable container sections for assembly of paragraph 33, wherein the storage container with an integrated controlled evaporative cooler includes internal structures in a radial configuration.

42. The set of portable container sections for assembly of paragraph 33, wherein the evaporative region includes a vapor-sealed gap between the inner storage container and the outer storage container.

43. The set of portable container sections for assembly of paragraph 33, wherein the evaporative region includes an evaporative liquid; a wick structure for the evaporative liquid; and a gas pressure less than the ambient gas pressure.

44. The set of portable container sections for assembly of paragraph 33, wherein the desiccant section includes an insulation unit including a vapor-sealed insulation region including substantially evacuated space.

45. The set of portable container sections for assembly of paragraph 33, wherein the desiccant section includes an insulation unit including a vapor-sealed insulation region with a gas pressure below $10^{-1}$ Torr.

46. The set of portable container sections for assembly of paragraph 33, wherein the desiccant section includes an insulation unit including a vapor-sealed insulation region with a gas pressure below $10^{-3}$ Torr.

47. The set of portable container sections for assembly of paragraph 33, wherein the desiccant section includes an insulation unit including a vapor-sealed insulation region with a gas pressure below $10^{-5}$ Torr.

48. The set of portable container sections for assembly of paragraph 33, wherein the desiccant section includes desiccant material.

49. The set of portable container sections for assembly of paragraph 33, wherein the central vapor conduit section includes: a valve of a size, shape and position to reversibly inhibit flow of gas through the vapor conduit; and a controller operably attached to the valve.

50. The set of portable container sections for assembly of paragraph 33, wherein the central vapor conduit section includes: a valve of a size, shape and position to reversibly inhibit flow of gas through the vapor conduit; and a binary switch operably attached to the valve, the switch positioned to cause the valve to fully open and fully close in response to an external action on the switch.

51. The set of portable container sections for assembly of paragraph 33, further including: a lid of a size and shape to reversibly mate with an edge of the portable container adjacent to the access aperture.

52. The set of portable container sections for assembly of paragraph 33, further including: a temperature sensor attached to the storage container; a heating element positioned adjacent to the storage container wall or the storage container bottom; and a controller connected to the temperature sensor, the vapor control unit, and the heating element.

53. The set of portable container sections for assembly of paragraph 33, further including an internal recharging system including: a temperature sensor affixed to the desiccant section; a heating element affixed to the desiccant section; and a controller connected to the temperature sensor and the heating element.

54. In some embodiments, a method of assembly of a set of portable container sections includes: positioning a storage container including an integral controlled evaporative cooling system and an evaporative section of a vapor conduit with an aperture external to the storage container within a desiccant section including an internal insulation unit and an outer desiccant region and a desiccant section of a vapor conduit with an aperture external to the desiccant section so that an exterior surface of the storage container is positioned within the insulation unit and the aperture of the evaporative section of the vapor conduit and the aperture of the desiccant section of the vapor conduit are aligned with each other; positioning a central vapor conduit section with a first end and a second end adjacent to the evaporative section and the desiccant section so that the first end of the central vapor conduit connects to the aperture of the evaporative section of the vapor conduit and the second end of the central vapor conduit connects to the aperture of the desiccant section of the vapor conduit; sealing the first end of the central vapor conduit to the aperture of the evaporative section of the vapor conduit with a gas-impermeable seal; sealing the second end of the central vapor conduit to the aperture of the desiccant section of the vapor conduit with a gas-impermeable seal; and substantially evacuating a continuous vapor-sealed interior region within the storage container, the desiccant section and the connected vapor conduit sections.

55. The method of assembly of a set of portable container sections of paragraph 54, wherein positioning the storage container includes positioning the storage container entirely within the desiccant section.

56. The method of assembly of a set of portable container sections of paragraph 54, wherein positioning the storage container includes positioning the storage container so that a storage region of the storage container is at the center, with the storage container surrounding the storage region, the insulation unit surrounding the storage container, and the desiccant region surrounding an exterior of the storage container.

57. The method of assembly of a set of portable container sections of paragraph 54, wherein positioning the central vapor conduit section includes positioning the central vapor conduit section to traverse an exterior top surface of the storage container and the desiccant section.

58. The method of assembly of a set of portable container sections of paragraph 54, wherein substantially evacuating a continuous vapor-sealed interior region includes evacuating the internal space to a gas pressure below $10^{-3}$ Torr.

59. The method of assembly of a set of portable container sections of paragraph 54, further including: adding an evaporative liquid to the integrated evaporative cooler prior to sealing the first end of the central vapor conduit to the aperture of the evaporative section of the vapor conduit.

60. The method of assembly of a set of portable container sections of paragraph 54, further including: adding a desiccant to the outer desiccant region prior to sealing the second end of the central vapor conduit to the aperture of the desiccant section of the vapor conduit.

61. In some embodiments, a portable container including an integral controlled evaporative cooling system, includes: an insulated storage compartment including at least one wall forming sides and a bottom of an interior of a storage container with an access aperture, at least one wall forming sides and a bottom of an exterior of the storage container, wherein the exterior is positioned adjacent to the interior and there is a gap between the exterior and the interior, a seal between the at least one wall forming the sides and the bottom of the interior and the at least one wall forming the sides and the bottom of the exterior, the seal forming a gas-impermeable gap between the walls; and a lid of a size and shape to match the insulated storage compartment, including at least one wall forming sides and a bottom of the lid, the sides and bottom of a size and shape to reversibly mate with the interior of the storage container at a position adjacent to the access aperture, at least one wall forming a top of the lid, the top of the lid affixed to the sides of the lid, an evaporative compartment positioned within the lid at a position adjacent to the bottom of the lid, the evaporative compartment including an internal evaporative region, the evaporative compartment including an aperture at a position distal to the bottom of the lid, a desiccant compartment within the lid at a position adjacent to the top of the lid, the desiccant compartment including an internal desiccant region, the desiccant compartment including an aperture at a position distal to the top of the lid, and a vapor conduit affixed at a first end to the aperture in the evaporative compartment and affixed at a second end to the aperture in the desiccant compartment, the vapor conduit including a vapor control unit, the combination of the vapor conduit, the evaporative region and the desiccant region with the vapor conduit forming a gas-sealed and liquid-sealed region within the lid.

62. The portable container including an integral controlled evaporative cooling system of paragraph 61 wherein the insulated storage compartment includes a single access aperture positioned at the top of the storage container.

63. The portable container including an integral controlled evaporative cooling system of paragraph 61 wherein the insulated storage compartment includes the access aperture of a size and shape to permit a human hand to access an interior of the storage container.

64. The portable container including an integral controlled evaporative cooling system of paragraph 61 wherein the insulated storage compartment includes a cylindrical structure with an open top region forming the access aperture.

65. The portable container including an integral controlled evaporative cooling system of paragraph 61 wherein the insulated storage compartment includes a structure with rounded edges and an open top region forming the access aperture.

66. The portable container including an integral controlled evaporative cooling system of paragraph 61 wherein the insulated storage compartment includes a structure of a size and shape to carry medicinals for a session of an outreach campaign.

67. The portable container including an integral controlled evaporative cooling system of paragraph 61 wherein the gas-impermeable gap between the walls of the insulated storage container includes substantially evacuated space.

68. The portable container including an integral controlled evaporative cooling system of paragraph 61 wherein the gas-impermeable gap between the walls of the insulated storage container includes space with a gas pressure below $10^{-1}$ Torr.

69. The portable container including an integral controlled evaporative cooling system of paragraph 61 wherein the gas-impermeable gap between the walls of the insulated storage container includes space with a gas pressure below $10^{-3}$ Torr.

70. The portable container including an integral controlled evaporative cooling system of paragraph 61 wherein the gas-impermeable gap between the walls of the insulated storage container includes space with a gas pressure below $10^{-5}$ Torr.

71. The portable container including an integral controlled evaporative cooling system of paragraph 61 wherein the evaporative compartment within the lid includes: an evaporative liquid; a wick structure for the evaporative liquid; and a gas pressure less than the ambient gas pressure.

72. The portable container including an integral controlled evaporative cooling system of paragraph 61 wherein the desiccant compartment within the lid includes desiccant material.

73. The portable container including an integral controlled evaporative cooling system of paragraph 61 wherein the vapor conduit within the lid includes a valve of a size, shape and position to reversibly inhibit flow of gas through the vapor conduit; and a controller operably attached to the valve.

74. The portable container including an integral controlled evaporative cooling system of paragraph 61 wherein the vapor conduit within the lid includes a temperature sensor; a valve of a size, shape and position to reversibly inhibit flow of gas through the vapor conduit in a continual manner; and a controller operably attached to the valve.

75. The portable container including an integral controlled evaporative cooling system of paragraph 61 wherein the vapor conduit within the lid includes a valve of a size, shape and position to reversibly inhibit flow of gas through the vapor conduit; and a binary switch operably attached to the valve, the switch positioned to cause the valve to fully open and fully close in response to an external action on the switch.

76. The portable container including an integral controlled evaporative cooling system of paragraph 61 wherein the lid further includes a display unit.

77. The portable container including an integral controlled evaporative cooling system of paragraph 61 further including a temperature sensor attached to the storage container; a heating element positioned adjacent to the storage container wall or the storage container bottom; and a controller connected to the temperature sensor, a vapor control unit attached to the vapor conduit, and the heating element.

78. The portable container including an integral controlled evaporative cooling system of paragraph 61 further including an internal recharging system including a temperature sensor attached to the storage container; a heating element attached to the desiccant compartment within the lid; and a controller connected to the temperature sensor and the heating element.

79. In some embodiments, a portable container including an integral controlled evaporative cooling system, includes at least one storage container wall configured to form a storage container with an access aperture; at least one insulation wall positioned adjacent to an exterior surface of the storage container wall, and affixed to the exterior surface to form a vapor-sealed insulation region external to a storage region; at least one desiccant region wall positioned adjacent to an exterior surface of the at least one insulation wall and sealed to the exterior surface of the at least one insulation wall to form a vapor-sealed desiccant region at least partially surrounding an exterior of the portable container; a lid for the portable container of a size and shape to reversibly mate with an interior surface of the at least one storage container wall, the lid including an internal vapor-sealed evaporative compartment, the lid including a bendable section positioned and configured to allow reversible access to the storage container; a vapor conduit with a first end positioned within the vapor-sealed evaporative region and a second end positioned within the vapor-sealed desiccant region, the vapor conduit including a bendable section aligned with the bendable section of the lid; and a vapor control unit attached to the vapor conduit.
80. The portable container including an integral controlled evaporative cooling system of paragraph 79, wherein the storage container includes a single access aperture positioned at the top of the storage container.
81. The portable container including an integral controlled evaporative cooling system of paragraph 79, wherein the storage container includes the access aperture of a size and shape to permit a human hand to access an interior of the storage container.
82. The portable container including an integral controlled evaporative cooling system of paragraph 79, wherein the storage container includes a cylindrical structure with an open top region forming the access aperture.
83. The portable container including an integral controlled evaporative cooling system of paragraph 79, wherein the storage container includes a structure with rounded edges and an open top region forming the access aperture.
84. The portable container including an integral controlled evaporative cooling system of paragraph 79, wherein the storage container includes a structure of a size and shape to carry medicinals for a session of an outreach campaign.
85. The portable container including an integral controlled evaporative cooling system of paragraph 79, wherein the vapor-sealed insulation region includes substantially evacuated space.
86. The portable container including an integral controlled evaporative cooling system of paragraph 79, wherein the vapor-sealed insulation region includes space with a gas pressure below $10^{-3}$ Torr.
87. The portable container including an integral controlled evaporative cooling system of paragraph 79, wherein the vapor-sealed insulation region includes space with a gas pressure below $10^{-5}$ Torr.
88. The portable container including an integral controlled evaporative cooling system of paragraph 79, wherein the vapor-sealed desiccant region includes desiccant material.
89. The portable container including an integral controlled evaporative cooling system of paragraph 79, wherein the vapor-sealed desiccant region surrounds the exterior of the portable container.
90. The portable container including an integral controlled evaporative cooling system of paragraph 79, wherein the internal vapor-sealed evaporative compartment within the lid is positioned adjacent to the storage region of the container when the lid is in a closed position.
91. The portable container including an integral controlled evaporative cooling system of paragraph 79, wherein the internal vapor-sealed evaporative compartment within the lid includes: an evaporative liquid; a wick structure for the evaporative liquid; and a gas pressure less than the ambient gas pressure.
92. The portable container including an integral controlled evaporative cooling system of paragraph 79, wherein the vapor conduit includes a gas pressure less than the ambient gas pressure.
93. The portable container including an integral controlled evaporative cooling system of paragraph 79, wherein the vapor control unit includes a valve of a size, shape and position to reversibly inhibit flow of gas through the vapor conduit; and a controller operably attached to the valve.
94. The portable container including an integral controlled evaporative cooling system of paragraph 79, wherein the vapor control unit includes a temperature sensor attached to the storage container; a valve of a size, shape and position to reversibly inhibit flow of gas through the vapor conduit in a continual manner; and a controller operably attached to the valve.
95. The portable container including an integral controlled evaporative cooling system of paragraph 79, wherein the lid further includes a valve of a size, shape and position to reversibly inhibit flow of gas through the vapor conduit; and a binary switch operably attached to the valve, the switch positioned to cause the valve to fully open and fully close in response to an external action on the switch.
96. The portable container including an integral controlled evaporative cooling system of paragraph 79, wherein the lid further includes a display unit.
97. The portable container including an integral controlled evaporative cooling system of paragraph 79, further including: a temperature sensor attached to the storage container; a heating element positioned adjacent to the storage container wall or the storage container bottom; and a controller connected to the temperature sensor, the vapor control unit, and the heating element.
98. The portable container including an integral controlled evaporative cooling system of paragraph 79, further including an internal recharging system including a temperature sensor attached to the storage container; a heating element positioned within or adjacent to the vapor-sealed desiccant region; and a controller connected to the temperature sensor and the heating element.
99. In some embodiments, a recharging device for a portable container including an integral controlled evaporative cooling system includes: a frame of a size and shape to secure a portable container including an integral controlled evaporative cooling system; at least one heating unit positioned adjacent to the exterior of the portable container including an integral controlled evaporative cooling system; at least one fan affixed to the frame, the fan oriented to direct air against an internal surface of the portable container including an integral controlled evaporative cooling system; and a controller operably connected to the at least one heating unit and the at least one fan, the controller capable of sending control signals to both the least one heating unit and the at least one fan.
100. The recharging device for a portable container including an integral controlled evaporative cooling system of paragraph 99, wherein the frame includes: at least one insulated wall positioned exterior to the at least one heating unit; at least one aperture at a top end of the recharging unit, the at least one aperture positioned to permit air flow to a bottom region of the secured portable container; and at least one aperture at a bottom end of the recharging unit, the at least one aperture positioned to permit air flow to a top region of the secured portable container.
101. The recharging device for a portable container including an integral controlled evaporative cooling system of paragraph 99, wherein the frame includes at least one sealing gasket positioned between a surface of the frame and a surface of a secured portable container.
102. The recharging device for a portable container including an integral controlled evaporative cooling system of paragraph 99, wherein the at least one heating unit includes: a radiative heating element; a cavity positioned between the heating element and a wall of a secured portable container; and a fan within the cavity, the fan positioned to move air to the wall of the secured portable container.
103. The recharging device for a portable container including an integral controlled evaporative cooling system of paragraph 99, wherein the at least one heating unit includes: an inductive heating element placed adjacent to a position where a surface of a portable container is predicted to be when the recharging unit is in use.
104. The recharging device for a portable container including an integral controlled evaporative cooling system of paragraph 99, wherein the at least one fan includes a fan positioned to increase air flow within a storage region of a secured portable container.
105. The recharging device for a portable container including an integral controlled evaporative cooling system of paragraph 99, wherein the controller includes circuitry configured to turn the at least one heating unit and the at least one fan on and off on a preset schedule.
106. The recharging device for a portable container including an integral controlled evaporative cooling system of paragraph 99, further including a temperature sensor positioned within the frame, the temperature sensor operably attached to the controller.
107. The recharging device for a portable container including an integral controlled evaporative cooling system of paragraph 99, wherein the controller includes circuitry configured to turn the at least one heating unit and the at least one fan on and off in response to signals received from the temperature sensor.
108. The recharging device for a portable container including an integral controlled evaporative cooling system of paragraph 99, further including a display unit.
109. The recharging device for a portable container including an integral controlled evaporative cooling system of paragraph 99, further including a user interface.

In some implementations described herein, logic and similar implementations may include computer programs or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components.

The subject matter described herein may be implemented in an analog or digital fashion or some combination thereof. In a general sense, some aspects described herein can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.).

Alternatively or additionally, implementations may include executing a special-purpose instruction sequence or invoking circuitry for enabling, triggering, coordinating, requesting, or otherwise causing one or more occurrences of virtually any functional operation described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit).

In a general sense, various aspects of the embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein "electro-mechanical system"

includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Examples of electro-mechanical systems include, but are not limited to, a variety of consumer electronics systems, medical devices, as well as other systems such as motorized transport systems, factory automation systems, security systems, and/or communication/computing systems.

At least a portion of the devices and/or processes described herein can be integrated into a data processing system. A data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components. In some instances, one or more components may be referred to herein as "configured to," "configured by," "configurable to," "operable/operative to," "adapted/adaptable," "able to," "conformable/conformed to," etc. Such terms (e.g. "configured to") generally encompass active-state components and/or inactive-state components and/or standby-state components, unless context requires otherwise.

The herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

While particular aspects of the present subject matter described herein have been shown and described, changes and modifications may be made without departing from the subject matter described herein and its broader aspects and, therefore, the appended claims are to encompass within their scope all such changes and modifications as are within the true spirit and scope of the subject matter described herein. In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended as "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended as "a system having at least one of A, B, or C" that would include but not be limited to systems that have A alone, B alone, C alone, A and B together, A and C together, B and C together, and/or A, B, and C together, etc. Typically, a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

All of the above U.S. patents, U.S. patent application publications, U.S. patent applications, foreign patents, foreign patent applications and non-patent publications referred to in this specification and/or listed in any ADS, are incorporated herein by reference, to the extent not inconsistent herewith.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A portable container including an integral controlled evaporative cooling system, comprising:
    a storage container wall sealed to a storage container bottom, the storage container wall and storage container bottom positioned to form a storage container with an access aperture;
    an evaporative region wall sealed to an evaporative region bottom, the evaporative region wall positioned adjacent to an exterior of the storage container wall and the evaporative region bottom positioned adjacent to an exterior of the storage container bottom, a top edge of the evaporative region wall sealed to the exterior of the storage container wall at a position below a top edge of the storage container wall to form a vapor-sealed evaporative region between the evaporative region wall and the evaporative region bottom and the storage container wall and the storage container bottom;
    an insulation wall positioned adjacent to an exterior surface of the evaporative region wall and the storage container wall, a top of the insulation wall sealed to the exterior surface of the storage container wall at a position above the evaporative region wall to form a vapor-sealed insulation region external to the storage container and to the evaporative region;
    a desiccant region wall positioned adjacent to an exterior surface of the insulation wall and sealed to the exterior surface of the insulation wall to form a vapor-sealed desiccant region, the desiccant region wall positioned to form an exterior surface of the portable container;
    a vapor conduit with a first end positioned within the vapor-sealed evaporative region and a second end positioned within the vapor-sealed desiccant region; and
    a vapor control unit attached to the vapor conduit, the vapor control unit including a valve of a size, shape, and position to reversibly inhibit flow of gas through the vapor conduit, and a controller operably attached to the valve.

2. The portable container including the integral controlled evaporative cooling system of claim 1, wherein the evaporative region wall and the evaporative region bottom are of a size, shape and position to form a gap between a surface of the evaporative region wall and the evaporative region bottom with the storage container wall and the storage container bottom.

3. The portable container including the integral controlled evaporative cooling system of claim 1, wherein the evaporative region wall is formed as a cylindrical structure.

4. The portable container including the integral controlled evaporative cooling system of claim 1, wherein the desiccant region wall encircles the exterior surface of the insulation wall.

5. The portable container including the integral controlled evaporative cooling system of claim 1, wherein the desiccant region wall is sealed to a desiccant region bottom, and the desiccant region bottom is positioned adjacent to an exterior of an insulation bottom to form a desiccant region adjacent to the insulation wall and insulation bottom.

6. The portable container including the integral controlled evaporative cooling system of claim 1, wherein the vapor-sealed desiccant region comprises:
    desiccant material.

7. The portable container including the integral controlled evaporative cooling system of claim 1, wherein the vapor conduit comprises:
    a hollow structure.

8. The portable container including the integral controlled evaporative cooling system of claim 1, wherein the desiccant region, the evaporative region and the vapor conduit are sealed together with a continuous vapor-sealed interior region including a gas pressure less than an ambient gas pressure adjacent to an exterior of the portable container.

9. The portable container including the integral controlled evaporative cooling system of claim 1, further comprising:
    a shutoff valve of a size, shape, and position to reversibly fully inhibit flow of gas through the vapor conduit; and a switch operably attached to the valve, the switch positioned to cause the valve to fully open and fully close in response to an external action on the switch.

10. The portable container including the integral controlled evaporative cooling system of claim 1, further comprising:
   a temperature sensor attached to the storage container;
   a heating element positioned adjacent to the storage container wall or the storage container bottom; and
   a controller connected to the temperature sensor, the vapor control unit, and the heating element.

11. A set of portable container sections including an integral controlled evaporative cooling system for assembly, comprising:
   a storage container with an integrated controlled evaporative cooler, including
   an interior storage container positioned with an access aperture at an upper region of the interior storage container,
   an outer storage container positioned with the access aperture at the upper region of the interior storage container, the outer storage container sealed to the interior storage container at a position adjacent to the access aperture to form a vapor-sealed evaporative region between the interior storage container and the outer storage container,
   and an evaporative section of a vapor conduit, the evaporative section including a first end positioned within the vapor-sealed evaporative region and a second end positioned at an upper region of the storage container with an aperture external to the storage container;
   a desiccant section including
   an insulation unit including an insulation wall with an interior surface of a size and shape to mate with an exterior surface of the storage container, and of a size and shape to extend beyond the access aperture of the storage container,
   a desiccant region wall with an interior surface of a size and shape to mate with an exterior surface of the insulation unit, the desiccant region wall encircling the insulation unit, the desiccant region wall sealed to the exterior of the insulation unit with a vapor-impermeable seal to form a desiccant region exterior to the insulation unit, the desiccant region wall positioned to form an exterior surface of a portable container, and
   a desiccant section of a vapor conduit, the desiccant section including a first end positioned within the desiccant region and a second end positioned at an upper region of the desiccant region with an aperture external to the desiccant region; and
   a central vapor conduit section, including
   a first end of a size and shape to mate and seal with the second end of the evaporative section of the vapor conduit,
   a second end of a size and shape to mate and seal with the second end of the desiccant section of the vapor conduit, and
   a connector section of the central vapor conduit positioned between the first end of the central vapor conduit and the second end of the central vapor conduit, the connector section of a size and shape to position the first end to mate and seal with the second end of the evaporative section and position the second end to mate and seal with the second end of the desiccant section;
   wherein the vapor conduit includes an attached vapor control unit and wherein the evaporative section, the desiccant section and the central vapor conduit section are each of a size and shape to fit together into a continuous vapor-sealed interior region of an integrated portable container including an integral controlled evaporative cooling system.

12. A method of assembly of a set of portable container sections including an integral controlled evaporative cooling system comprising:
   positioning a storage container including an integral controlled evaporative cooling system and an evaporative section of a vapor conduit with an aperture external to the storage container within a desiccant section including an internal insulation unit and an outer desiccant region and a desiccant section of a vapor conduit with an aperture external to the desiccant section so that an exterior surface of the storage container is positioned within and surrounded by the insulation unit of the desiccant section and the aperture of the evaporative section of the vapor conduit and the aperture of the desiccant section of the vapor conduit are aligned with each other;
   positioning a central vapor conduit section with a first end and a second end adjacent to the evaporative section and the desiccant section so that the first end of the central vapor conduit connects to the aperture of the evaporative section of the vapor conduit and the second end of the central vapor conduit connects to the aperture of the desiccant section of the vapor conduit;
   sealing the first end of the central vapor conduit to the aperture of the evaporative section of the vapor conduit with a gas-impermeable seal;
   sealing the second end of the central vapor conduit to the aperture of the desiccant section of the vapor conduit with a gas-impermeable seal; and
   substantially evacuating a continuous vapor-sealed interior region within the storage container, the desiccant section, and the connected vapor conduit sections.

* * * * *